US011527013B2

United States Patent
Hayakawa et al.

(10) Patent No.: US 11,527,013 B2
(45) Date of Patent: Dec. 13, 2022

(54) CAMERA PARAMETER ESTIMATING DEVICE, CAMERA PARAMETER ESTIMATING METHOD, AND CAMERA PARAMETER ESTIMATING PROGRAM

(71) Applicant: AISIN CORPORATION, Kariya (JP)

(72) Inventors: Kazutaka Hayakawa, Kariya (JP); Tomokazu Sato, Hikone (JP)

(73) Assignee: AISIN CORPORATION, Kariya (JP)

( * ) Notice: Subject to any disclaimer, the term of this patent is extended or adjusted under 35 U.S.C. 154(b) by 560 days.

(21) Appl. No.: 16/661,391

(22) Filed: Oct. 23, 2019

(65) Prior Publication Data

US 2020/0134871 A1 Apr. 30, 2020

(30) Foreign Application Priority Data

Oct. 25, 2018 (JP) .............................. JP2018-200798

(51) Int. Cl.
*G06T 7/80* (2017.01)
*G06T 7/70* (2017.01)

(52) U.S. Cl.
CPC ................ *G06T 7/80* (2017.01); *G06T 7/70* (2017.01); *G06T 2207/30252* (2013.01)

(58) Field of Classification Search
CPC ... G06T 7/80; G06T 7/70; G06T 2207/30252; G06T 7/246; G06T 2207/30244; G06T 1/00; H04N 7/18; H04N 5/232; B60R 1/00

See application file for complete search history.

(56) References Cited

U.S. PATENT DOCUMENTS

| 8,212,878 | B2 | 7/2012 | Shima et al. |
| 9,098,750 | B2 * | 8/2015 | Azuma ................. G06V 20/56 |
| 10,694,148 | B1 * | 6/2020 | Li ....................... G01C 21/1656 |
| 2014/0139674 | A1 * | 5/2014 | Aoki ........................ G06T 7/85 |
| | | | 348/148 |

FOREIGN PATENT DOCUMENTS

JP 4820221 B2 11/2011

* cited by examiner

*Primary Examiner* — Michael E Teitelbaum
*Assistant Examiner* — Humam M Satti
(74) *Attorney, Agent, or Firm* — Sughrue Mion, PLLC

(57) ABSTRACT

A camera parameter estimating device includes: a camera position posture acquisition unit acquiring estimated position and posture of a camera, based on a captured image acquired by the camera; a first vector calculation unit calculating a first vector corresponding to a traveling direction of the vehicle; a second vector calculation unit calculating a second vector corresponding to a normal direction of a plane corresponding to a road surface on which the vehicle travels; a third vector calculation unit calculating a third vector orthogonal to the first and second vectors; and a camera parameter estimation unit estimating an actual installation posture of the camera on the basis of the first, second and third vectors and the estimated posture of the camera when the estimated position moves along a direction indicated by the first vector.

13 Claims, 9 Drawing Sheets

CAMERA PARAMETER ESTIMATING DEVICE, CAMERA PARAMETER ESTIMATING METHOD, AND CAMERA PARAMETER ESTIMATING PROGRAM

CROSS REFERENCE TO RELATED APPLICATIONS

This application is based on and claims priority under 35 U.S.C. § 119 to Japanese Patent Application 2018-200798, filed on Oct. 25, 2018, the entire contents of which are incorporated herein by reference.

TECHNICAL FIELD

This disclosure relates to a camera parameter estimating device, a camera parameter estimating method, and a camera parameter estimating program.

BACKGROUND DISCUSSION

A technology has been conventionally known in which on the basis of a captured image that is obtained by imaging a specific road surface marking set on a road surface by using a surrounding monitoring camera mounted in a vehicle, graphical features of the corresponding specific road surface marking are detected, and then on the basis of the detection result, a camera parameter including an actual installation posture of the camera in the vehicle is estimated. See, for example, JP 4820221 B (Reference 1).

However, in order to estimate the camera parameter by the above-described conventional technology, it is assumed that the specific road surface marking is set, and regular data representing the graphical features of the corresponding specific road surface marking is stored in advance for matching with the features detected from the captured image. This causes lack of flexibility.

Thus, a need exists for a camera parameter estimating device, a camera parameter estimating method, and a camera parameter estimating program which are not susceptible to the drawback mentioned above.

SUMMARY

A camera parameter estimating device according to an aspect of this disclosure includes: a camera position posture acquisition unit configured to acquire an estimated position and an estimated posture of a surrounding monitoring camera mounted in a vehicle in a camera coordinate system set for the camera, which are estimated based on a captured image acquired by the camera; a first vector calculation unit configured to calculate a first vector corresponding to a traveling direction of the vehicle in the camera coordinate system on the basis of transition of the estimated position of the camera when the vehicle travels straight; a second vector calculation unit configured to calculate a second vector corresponding to a normal direction of a plane corresponding, in the camera coordinate system, to a road surface on which the vehicle travels, on the basis of the transition of the estimated position of the camera when the vehicle turns; a third vector calculation unit configured to calculate a third vector orthogonal to the first vector and the second vector, in the camera coordinate system; and a camera parameter estimation unit configured to estimate an actual installation posture of the camera in the vehicle, as a camera parameter for calibration of the camera, on the basis of the first vector, the second vector, the third vector, and the estimated posture of the camera when the estimated position of the camera moves along a direction indicated by the first vector.

A camera parameter estimating method according to another aspect of this disclosure includes: acquiring an estimated position and an estimated posture of a surrounding monitoring camera mounted in a vehicle in a camera coordinate system set for the camera, which are estimated based on a captured image acquired by the camera; calculating a first vector corresponding to a traveling direction of the vehicle in the camera coordinate system on the basis of transition of the estimated position of the camera when the vehicle travels straight; calculating a second vector corresponding to a normal direction of a plane corresponding, in the camera coordinate system, to a road surface on which the vehicle travels, on the basis of the transition of the estimated position of the camera when the vehicle turns; calculating a third vector orthogonal to the first vector and the second vector in the camera coordinate system; and estimating an actual installation posture of the camera in the vehicle, as a camera parameter for calibration of the camera, on the basis of the first vector, the second vector, the third vector, and the estimated posture of the camera when the estimated position of the camera moves along a direction indicated by the first vector.

A camera parameter estimating program according to another aspect of this disclosure causes a computer to execute a process including: acquiring an estimated position and an estimated posture of a surrounding monitoring camera mounted in a vehicle in a camera coordinate system set for the camera, which are estimated based on a captured image acquired by the camera; calculating a first vector corresponding to a traveling direction of the vehicle in the camera coordinate system on the basis of transition of the estimated position of the camera when the vehicle travels straight; calculating a second vector corresponding to a normal direction of a plane corresponding, in the camera coordinate system, to a road surface on which the vehicle travels, on the basis of the transition of the estimated position of the camera when the vehicle turns; calculating a third vector orthogonal to the first vector and the second vector in the camera coordinate system; and estimating an actual installation posture of the camera in the vehicle, as a camera parameter for calibration of the camera, on the basis of the first vector, the second vector, the third vector, and the estimated posture of the camera when the estimated position of the camera moves along a direction indicated by the first vector.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here and a modification will be described with reference to drawings. Configurations of the embodiment and the modification to be described below, and actions and results (effects) caused by the corresponding configurations are merely exemplary, and are not limited to the following descriptions.

Embodiment

Figure 1:
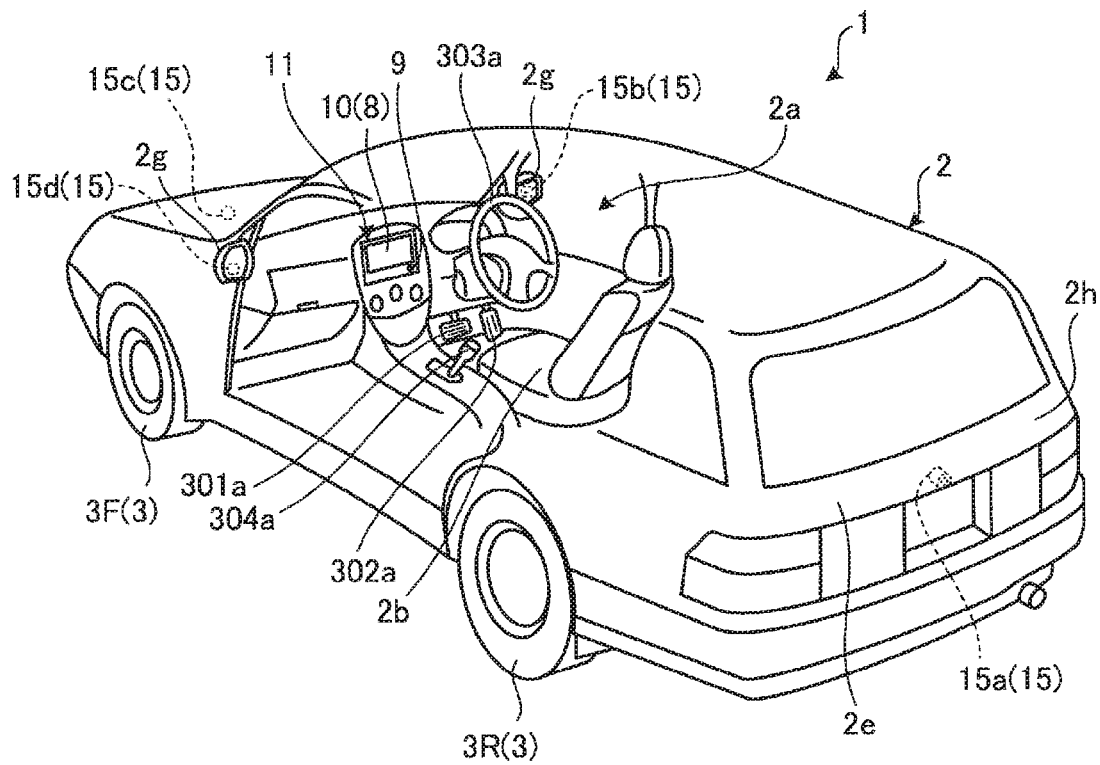
FIG. 1 is an exemplary schematic view illustrating a configuration within a vehicle cabin of a vehicle according to an embodiment.
Figure 2:
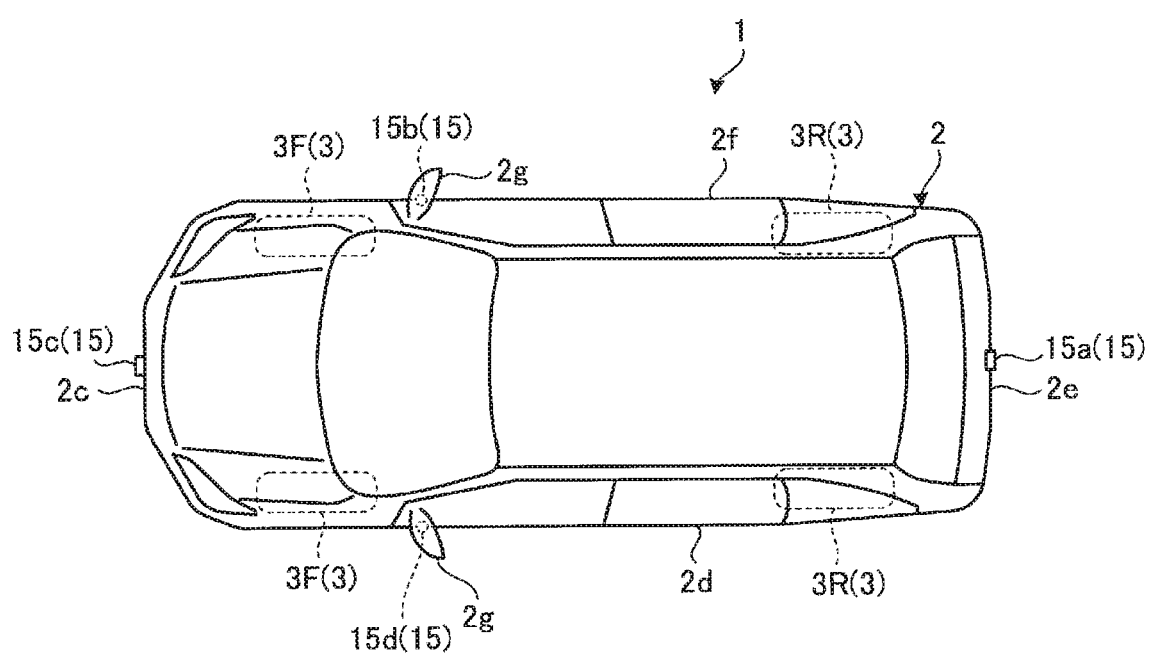
FIG. 2 is an exemplary schematic view illustrating an appearance of the vehicle according to the embodiment when viewed from above.

First, descriptions will be made on a schematic configuration of a vehicle 1 according to the embodiment with reference to FIGS. 1 and 2. FIG. 1 is an exemplary schematic view illustrating a configuration within a vehicle cabin 2a of the vehicle 1 according to the embodiment, and FIG. 2 is an exemplary schematic view illustrating an appearance of the vehicle 1 according to the embodiment when viewed from above.

As illustrated in FIG. 1, the vehicle 1 according to the embodiment includes the vehicle cabin 2a where passengers including a driver as a user sit. Within the vehicle cabin 2a, a brake unit (a braking operation unit) 301a, an acceleration unit (an acceleration operation unit) 302a, a steering unit 303a, a transmission unit (a transmission operation unit) 304a, and the like are set while operable by the user on a seat 2b.

The brake unit 301a is, for example, a brake pedal provided under a foot of the driver, and the acceleration unit 302a is, for example, an accelerator pedal provided under the foot of the driver. The steering unit 303a is, for example, a steering wheel protruding from a dashboard (an instrument panel), and the transmission unit 304a is, for example, a shift lever protruding from a center console. The steering unit 303a may be a handle.

A monitor device 11 is provided within the vehicle cabin 2a, which includes a display unit 8 capable of outputting various images, and a voice output unit 9 capable of outputting various sounds. The monitor device 11 is provided, for example, at the central portion in the width direction (the left-right direction) of the dashboard within the vehicle cabin 2a. The display unit 8 is constituted by, for example, an LCD (liquid crystal display), an OELD (organic electroluminescent display), and the like.

Here, an operation input unit 10 is provided on a display screen as an area where an image is displayed, on the display unit 8. The operation input unit 10 is configured as, for example, a touch panel capable of detecting coordinates of a location where an indicator such as a finger or a stylus comes close (including contact). Accordingly, the user (the driver) is capable of visually recognizing the image displayed on the display screen of the display unit 8, and also is capable of executing various operation inputs by executing a touch (tap) operation and the like on the operation input unit 10 by using the indicator.

In the embodiment, the operation input unit 10 may be various physical interfaces such as a switch, a dial, a joystick, and a push button. In the embodiment, another voice output device may be provided at a position different from the position of the monitor device 11, within the vehicle cabin 2a. In this case, various sound information may be output from both the voice output unit 9 and another voice output device. In the embodiment, the monitor device 11 may be configured to be capable of displaying information on various systems such as a navigation system or an audio system.

As illustrated in FIGS. 1 and 2, the vehicle 1 according to the embodiment is configured as a four-wheeled automobile including two left and right front wheels 3F and two left and right rear wheels 3R. Hereinafter, for the sake of simplicity, the front wheels 3F and the rear wheels 3R may be collectively referred to as wheels 3. In the embodiment, sideslip angles of a part or all of the four wheels 3 are changed (steered) according to an operation and the like of the steering unit 303a.

The vehicle 1 is mounted with a plurality of surrounding monitoring in-vehicle cameras 15a to 15d (four in the example illustrated in FIGS. 1 and 2). The in-vehicle camera 15a is provided at a rear-side end portion 2e (for example, under a door 2h of a rear trunk) of a vehicle body 2 to image a rear area of the vehicle 1. The in-vehicle camera 15b is provided on a door mirror 2g at a right end portion 2f of the vehicle body 2 to image a right side area of the vehicle 1. The in-vehicle camera 15c is provided at a front-side end portion 2c (for example, a front bumper) of the vehicle body 2 to image a front area of the vehicle 1. The in-vehicle camera 15d is provided on a door mirror 2g at a left end portion 2d of the vehicle body 2 to image a left side area of the vehicle 1. Hereinafter, for the sake of simplicity, the in-vehicle cameras 15a to 15d may be collectively referred to as in-vehicle cameras 15.

The in-vehicle camera 15 is, for example, a so-called digital camera that has an imaging element such as a CCD (charge-coupled device) or a CIS (CMOS (complementary metal-oxide-semiconductor) image sensor). The in-vehicle camera 15 performs imaging of the surroundings of the vehicle 1 at a predetermined frame rate, and outputs image data of a captured image obtained by the corresponding imaging. The image data obtained by the in-vehicle camera 15 is capable of constituting a moving image as a frame image.

In the embodiment, as a configuration for sensing the situation around the vehicle 1, in addition to the above-described in-vehicle camera 15, a distance measurement sensor that detects (calculates, specifies) the distance to a three-dimensional object present around the vehicle 1 may be provided. As such a distance measurement sensor, for example, a sonar that transmits sound waves and receives sound waves reflected from an object present around the vehicle 1, or a laser radar that transmits radio waves such as light, and receives radio waves reflected from an object present around the vehicle 1, is used.

Next, descriptions will be made on a system configuration provided to realize various controls in the vehicle 1 according to the embodiment, with reference to FIG. 3. The system configuration illustrated in FIG. 3 is merely an example, and may be set (changed) in various ways.

Figure 3:
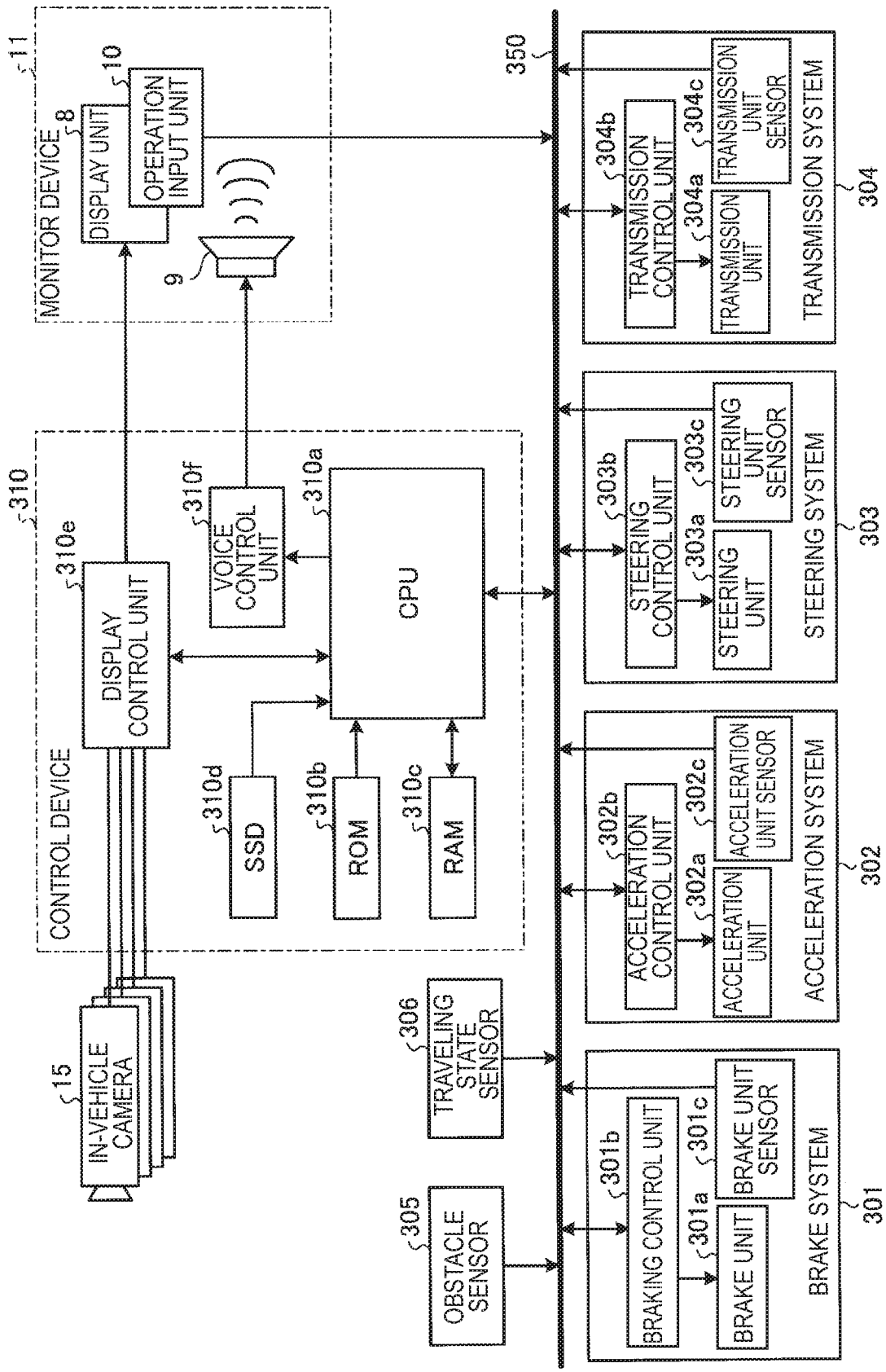
FIG. 3 is an exemplary schematic block diagram illustrating a system configuration of the vehicle according to the embodiment.

FIG. 3 is an exemplary schematic block diagram illustrating a system configuration of the vehicle 1 according to the embodiment. As illustrated in FIG. 3, the vehicle 1 according to the embodiment includes a brake system 301, an acceleration system 302, a steering system 303, a transmission system 304, an obstacle sensor 305, a traveling state sensor 306, the in-vehicle cameras 15, the monitor device 11, a control device 310, and an in-vehicle network 350.

The brake system 301 controls the deceleration of the vehicle 1. The brake system 301 includes the brake unit 301*a*, a braking control unit 301*b*, and a brake unit sensor 301*c*.

The brake unit 301*a* is, for example, a device for decelerating the vehicle 1, such as the above-described brake pedal.

The braking control unit 301*b* is configured as, for example, a microcomputer having a hardware processor such as a central processing unit (CPU). The braking control unit 301*b* controls a deceleration amount of the vehicle 1 by driving an actuator (not illustrated) on the basis of, for example, an instruction input via the in-vehicle network 350, and operating the brake unit 301*a*.

The brake unit sensor 301*c* is a device for detecting the state of the brake unit 301*a*. For example, when the brake unit 301*a* is configured as a brake pedal, the brake unit sensor 301*c* detects the position of the brake pedal or the pressure acting on the corresponding brake pedal as the state of the brake unit 301*a*. The brake unit sensor 301*c* outputs the detected state of the brake unit 301*a* to the in-vehicle network 350.

The acceleration system 302 controls the acceleration of the vehicle 1. The acceleration system 302 includes the acceleration unit 302*a*, an acceleration control unit 302*b*, and an acceleration unit sensor 302*c*.

The acceleration unit 302*a* is, for example, a device for accelerating the vehicle 1, such as the above-described accelerator pedal.

The acceleration control unit 302*b* is configured as, for example, a microcomputer having a hardware processor such as a CPU. The acceleration control unit 302*b* controls an acceleration amount of the vehicle 1 by driving an actuator (not illustrated) on the basis of, for example, an instruction input via the in-vehicle network 350, and operating the acceleration unit 302*a*.

The acceleration unit sensor 302*c* is a device for detecting the state of the acceleration unit 302*a*. For example, when the acceleration unit 302*a* is configured as an accelerator pedal, the acceleration unit sensor 302*c* detects the position of the accelerator pedal or the pressure acting on the corresponding accelerator pedal. The acceleration unit sensor 302*c* outputs the detected state of the acceleration unit 302*a* to the in-vehicle network 350.

The steering system 303 controls the traveling direction of the vehicle 1. The steering system 303 includes the steering unit 303*a*, a steering control unit 303*b*, and a steering unit sensor 303*c*.

The steering unit 303*a* is, for example, a device that steers steerable wheels of the vehicle 1, such as the steering wheel or the handle as described above.

The steering control unit 303*b* is configured as, for example, a microcomputer having a hardware processor such as a CPU. The steering control unit 303*b* controls a traveling direction of the vehicle 1 by driving an actuator (not illustrated) on the basis of, for example, an instruction input via the in-vehicle network 350, and operating the steering unit 303*a*.

The steering unit sensor 303*c* is a device for detecting the state of the steering unit 303*a*. For example, when the steering unit 303*a* is configured as a steering wheel, the steering unit sensor 303*c* detects the position of the steering wheel or the rotation angle of the corresponding steering wheel. When the steering unit 303*a* is configured as a handle, the steering unit sensor 303*c* may detect the position of the handle or the pressure acting on the corresponding handle. The steering unit sensor 303*c* outputs the detected state of the steering unit 303*a* to the in-vehicle network 350.

The transmission system 304 controls a gear ratio of the vehicle 1. The transmission system 304 includes the transmission unit 304*a*, a transmission control unit 304*b*, and a transmission unit sensor 304*c*.

The transmission unit 304*a* is, for example, a device for changing the gear ratio of the vehicle 1, such as the above-described shift lever.

The transmission control unit 304*b* is configured as, for example, a computer having a hardware processor such as a CPU. The transmission control unit 304*b* controls the gear ratio of the vehicle 1 by driving an actuator (not illustrated) on the basis of, for example, an instruction input via the in-vehicle network 350, and operating the transmission unit 304*a*.

The transmission unit sensor 304*c* is a device for detecting the state of the transmission unit 304*a*. For example, when the transmission unit 304*a* is configured as a shift lever, the transmission unit sensor 304*c* detects the position of the shift lever or the pressure acting on the corresponding shift lever. The transmission unit sensor 304*c* outputs the detected state of the transmission unit 304*a* to the in-vehicle network 350.

The obstacle sensor 305 is a device for detecting information on an obstacle that may exist around the vehicle 1. The obstacle sensor 305 includes, for example, a distance measurement sensor such as the sonar or the laser radar as described above. The obstacle sensor 305 outputs the detected information to the in-vehicle network 350.

The traveling state sensor 306 is a device for detecting the traveling state of the vehicle 1. The traveling state sensor 306 includes, for example, a wheel speed sensor that detects the wheel speed of the vehicle 1, an acceleration sensor that detects the acceleration in the front-rear direction or the left-right direction of the vehicle 1, a gyro sensor that detects the turning speed (the angular speed) of the vehicle 1, and the like. The traveling state sensor 306 outputs the detected traveling state to the in-vehicle network 350.

The control device 310 is a device that comprehensively controls various systems provided in the vehicle 1. Although details will be described below, the control device 310 according to the embodiment has a function of estimating a camera parameter including the actual installation posture (and the installation height) of the in-vehicle camera 15 in the vehicle 1 on the basis of information obtained by the in-vehicle camera 15, and executing calibration including optical axis correction of the in-vehicle camera 15 on the basis of the estimation result.

More specifically, the control device 310 is configured as an electronic control unit (ECU) that includes a central processing unit (CPU) 310a, a read only memory (ROM) 310b, a random access memory (RAM) 310c, a solid state drive (SSD) 310d, a display control unit 310e, and a voice control unit 310f.

The CPU 310a is a hardware processor that comprehensively controls the control device 310. The CPU 310a reads various control programs (computer programs) stored in the ROM 310b and the like, and realizes various functions according to instructions defined in the corresponding various control programs. The various control programs include a passenger monitoring program for realizing a passenger monitoring process.

The ROM 310b is a non-volatile main storage device that stores parameters and the like required for executing the above-described various control programs.

The RAM 310c is a volatile main storage device that provides a work area of the CPU 310a.

The SSD 310d is a rewritable non-volatile auxiliary storage device. In the control device 310 according to the embodiment, as the auxiliary storage device, a hard disk drive (HDD) may be provided in place of the SSD 310d (or in addition to the SSD 310d).

The display control unit 310e is mainly in charge of an image processing on a captured image obtained from the in-vehicle camera 15, generation of image data to be output to the display unit 8 of the monitor device 11, and the like among various processings executable by the control device 310.

The voice control unit 310f is mainly in charge of generation of voice data to be output to the voice output unit 9 of the monitor device 11, and the like among various processings executable by the control device 310.

The in-vehicle network 350 connects the brake system 301, the acceleration system 302, the steering system 303, the transmission system 304, the obstacle sensor 305, the traveling state sensor 306, the operation input unit 10 of the monitor device 11, and the control device 310 to each other in a communication available manner.

Meanwhile, there has conventionally been known a technology in which on the basis of a captured image that is obtained by imaging a specific road surface marking set on a road surface by using a surrounding monitoring camera mounted in a vehicle, such as the above-described in-vehicle camera 15, graphical features of the corresponding specific road surface marking are detected, and then on the basis of the detection result, a camera parameter including an actual installation posture of the camera in the vehicle is estimated.

However, in order to estimate the camera parameter by the above-described conventional technology, it is assumed that the specific road surface marking is set, and regular data representing the graphical features of the corresponding specific road surface marking is stored in advance for matching with the features detected from the captured image. This causes lack of flexibility.

Figure 4:
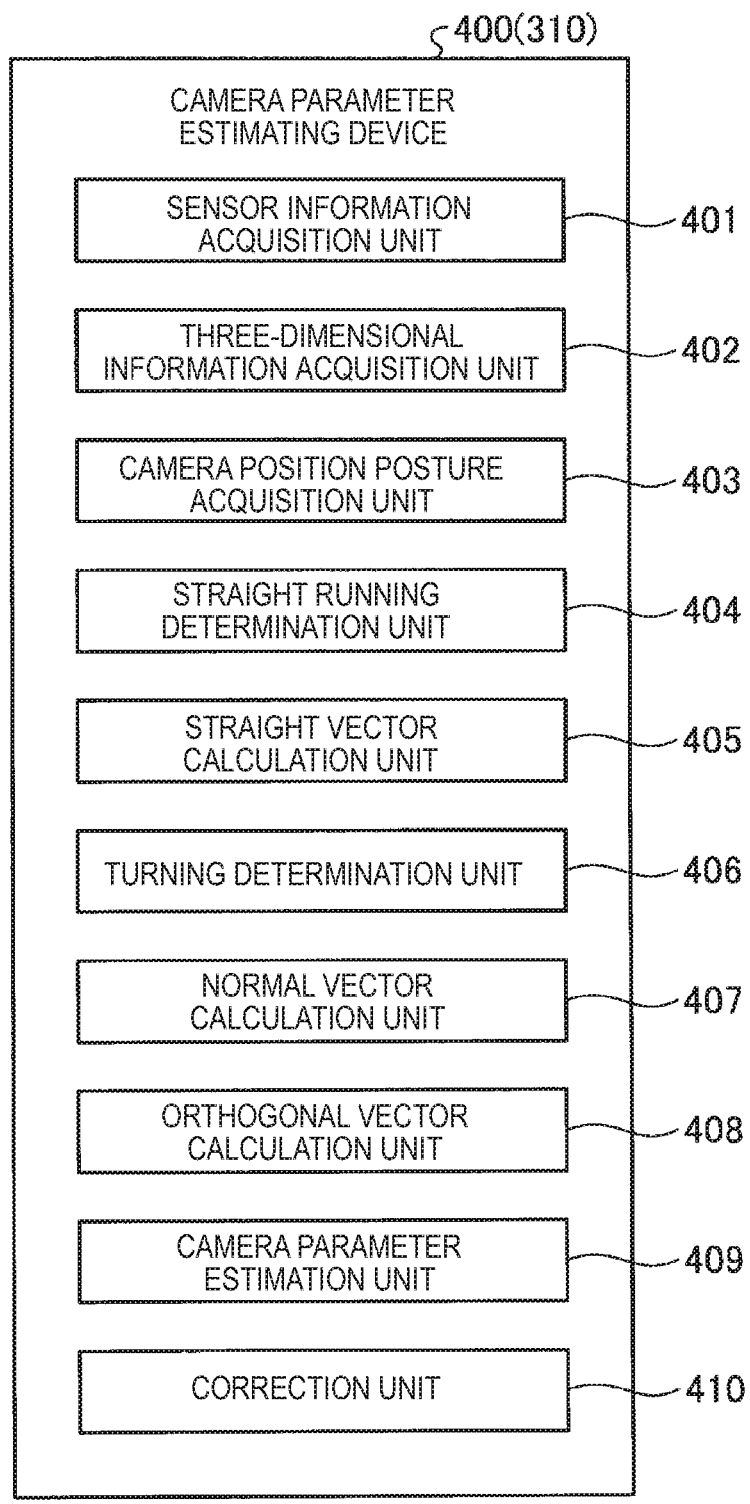
FIG. 4 is an exemplary schematic block diagram illustrating functions of a camera parameter estimating device according to the embodiment.

Therefore, in the embodiment, a camera parameter estimating device 400 having the following functions as illustrated in FIG. 4 is realized in the control device 310 so that flexible estimation of a camera parameter may be realized without depending on the specific road surface marking.

FIG. 4 is an exemplary schematic block diagram illustrating functions of the camera parameter estimating device 400 according to the embodiment. The functions illustrated in FIG. 4 are realized in the control device 310 by cooperation of software and hardware. That is, when the CPU 310a of the control device 310 reads and executes a predetermined control program (a camera parameter estimating program) stored in the ROM 310b, and the like, as a result, the functions illustrated in FIG. 4 are realized. In the embodiment, at least a part of the functions illustrated in FIG. 4 may be realized by dedicated hardware (circuit).

As illustrated in FIG. 4, the camera parameter estimating device 400 according to the embodiment includes a sensor information acquisition unit 401, a three-dimensional information acquisition unit 402, a camera position posture acquisition unit 403, a straight running determination unit 404, a straight vector calculation unit 405, a turning determination unit 406, a normal vector calculation unit 407, an orthogonal vector calculation unit 408, a camera parameter estimation unit 409, and a correction unit 410.

The straight running determination unit 404 is an example of "a first determination unit," and the straight vector calculation unit 405 is an example of "a first vector calculation unit." The turning determination unit 406 is an example of "a second determination unit," and the normal vector calculation unit 407 is an example of "a second vector calculation unit." The orthogonal vector calculation unit 408 is an example of "a third vector calculation unit."

The sensor information acquisition unit 401 acquires sensor information including the output of the traveling state sensor 306 that detects the traveling state of the vehicle 1. From such sensor information, it is possible to calculate, for example, a traveling distance (moving distance) of the vehicle 1.

The three-dimensional information acquisition unit 402 acquires three-dimensional information indicating the situation around the vehicle 1 estimated based on a captured image acquired by the in-vehicle camera 15. The three-dimensional information includes a (estimated) three-dimensional position of a road surface on which the vehicle 1 travels. It is possible to calculate the three-dimensional information by an image processing using a plurality of captured images (in continuous frames), such as, for example, Structure from Motion, Visual Slam, or Visual Odometry.

The above-described image processing for calculating the three-dimensional information may be used as a technique that allows the vehicle 1 to autonomously create a map around the traveling route of the vehicle 1. Therefore, in the embodiment, the three-dimensional information acquisition unit 402 may calculate three-dimensional information by executing the above-described image processing by itself, or may acquire three-dimensional information calculated by a map creation function that is configured separately from the camera parameter estimating device 400, through a communication and the like.

The camera position posture acquisition unit 403 acquires the (estimated) position and posture of the in-vehicle camera 15, which are estimated based on a captured image acquired by the in-vehicle camera 15. Similarly to the above-described three-dimensional information, it is possible to calculate the estimated position and posture of the in-vehicle camera 15 by an image processing using a plurality of captured images. Therefore, similarly to the above-described three-dimensional information, the estimated position and posture of the in-vehicle camera 15 may be calculated by the camera position posture acquisition unit 403 itself, or may be calculated by a map creation function that is configured separately from the camera parameter estimating device 400.

Meanwhile, the above-described image processing using the plurality of captured images is basically a technique for obtaining a relative positional relationship between the in-vehicle camera 15 and another object. That is, it is not possible to obtain the absolute position and posture of the in-vehicle camera 15 itself only by the above-described image processing. Therefore, the estimated position and posture of the in-vehicle camera 15, which are acquired by the camera position posture acquisition unit 403, are not (absolute) information corresponding to the real world, but are merely information based on a camera coordinate system (see FIG. 5 to be described below) set for the in-vehicle camera 15.

Meanwhile, information to be noted in calibration of the in-vehicle camera 15 is a camera parameter including the actual (that is, absolute corresponding to the real world) installation position and installation posture of the in-vehicle camera 15 in the vehicle 1. Therefore, in the embodiment, in order to obtain the camera parameter, it is required to convert information that is based on the camera coordinate system and is obtained by the above-described image processing, into information based on a coordinate system corresponding to the real world, for example, a vehicle coordinate system matched with the direction of the vehicle 1 (see FIG. 5 to be described below).

Figure 5:
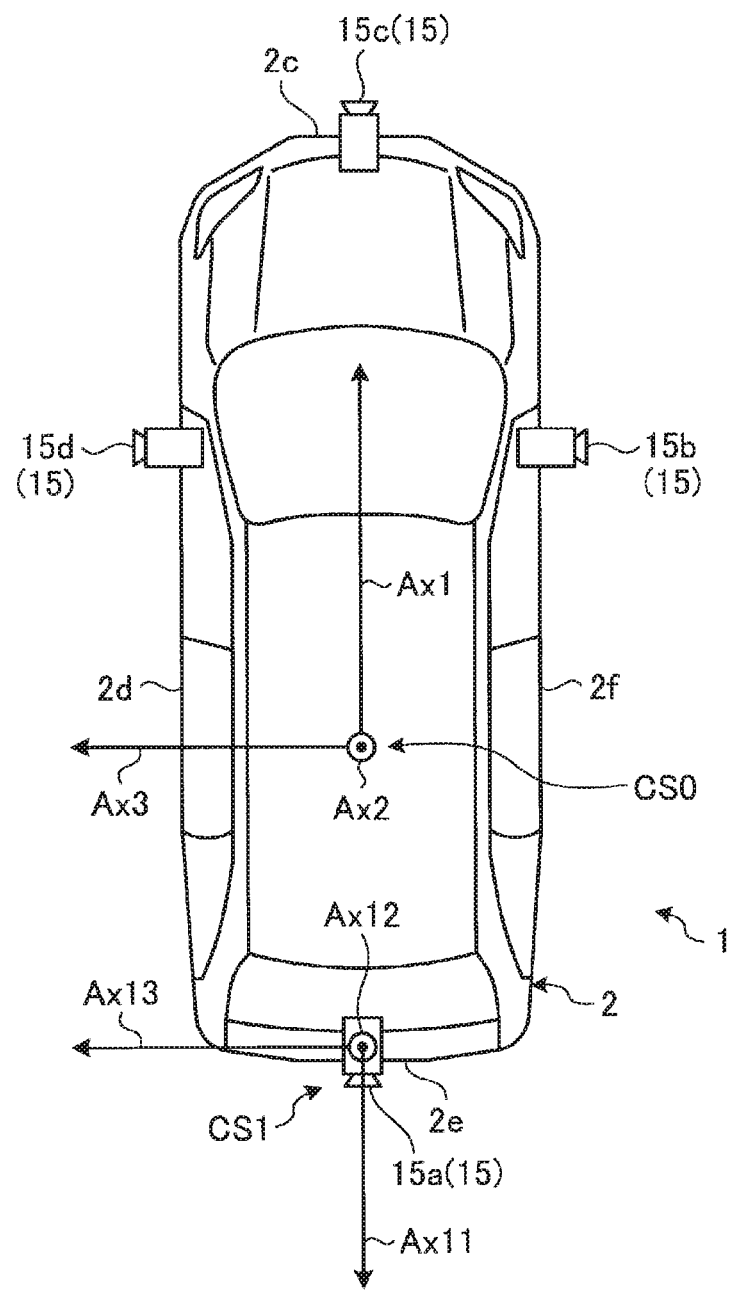
FIG. 5 is an exemplary schematic view illustrating an example of a camera coordinate system and a vehicle coordinate system according to the embodiment.

Here, the above-described two types of coordinate systems will be briefly described. FIG. 5 is an exemplary schematic view illustrating an example of a camera coordinate system and a vehicle coordinate system according to the embodiment. In the example illustrated in FIG. 5, for convenience, the in-vehicle camera 15 provided in the vehicle 1 is emphatically illustrated.

In the example illustrated in FIG. 5, a coordinate system CS1 having three axes Ax11 to Ax13 orthogonal to each other corresponds to a camera coordinate system set for the in-vehicle camera 15*a*. Through the above-described image processing based on a plurality of captured images obtained by the in-vehicle camera 15*a*, it is possible to estimate the position and the posture of the in-vehicle camera 15*a* in the coordinate system CS1. In the coordinate system CS1, it is possible to represent the position by three components corresponding to the axes Ax11 to Ax13, respectively, and it is possible to represent the posture as three rotation angles around the axes Ax11 to Ax13.

For example, when the origin of the coordinate system CS1 as the camera coordinate system is represented as a position where the in-vehicle camera 15*a* exists at a predetermined time, the axis Ax11 is represented as the optical axis of the in-vehicle camera 15*a* at the corresponding predetermined time, the axis Ax12 is represented as an axis that is perpendicular to the optical axis and extends in a direction corresponding to the vertical direction (up-down direction) of a captured image, and the axis Ax13 is represented as an axis that is perpendicular to the optical axis and extends in a direction corresponding to the horizontal direction (left-right direction) of the captured image.

In the example illustrated in FIG. 5, only the coordinate system CS1 as the camera coordinate system set for the in-vehicle camera 15*a* is illustrated, but it is needless to say that a specific camera coordinate system is also set for each of other in-vehicle cameras 15*b* to 15*d*. The camera coordinate systems set for other in-vehicle cameras 15*b* to 15*d*, respectively, are omitted in illustration for the sake of simplicity.

Meanwhile, in the example illustrated in FIG. 5, a coordinate system CS0 having three axes Ax1 to Ax3 orthogonal to each other corresponds to a vehicle coordinate system based on the vehicle 1. For example, the axis Ax1 corresponds to the front-rear direction (traveling direction) of the vehicle 1, the axis Ax2 corresponds to the up-down direction (vertical direction) of the vehicle 1, and the axis Ax3 corresponds to the left-right direction (width direction) of the vehicle 1.

In the example illustrated in FIG. 5, the direction of the axis Ax1 in the coordinate system CS0 is opposite to the direction of the axis Ax11 in the coordinate system CS1, and the directions of the axis Ax2 and the axis Ax3 in the coordinate system CS0 match the directions of the axis Ax12 and the axis Ax13 in the coordinate system CS1, respectively, in the illustration, but this is merely an example. In the embodiment, the relationship between the axes Ax1 to Ax3 of the coordinate system CS0 and the axes Ax11 to Ax13 of the coordinate system CS1 may not be necessarily the relationship as illustrated in FIG. 5.

In this way, since the vehicle coordinate system and the camera coordinate system are three-dimensional coordinate systems having different origins and different coordinate axes, calibration is required whenever the position and the posture of the in-vehicle camera 15*a* are deviated.

Here, if it is possible to obtain the direction of each of the axes Ax1 to Ax3 in the coordinate system CS0 as the vehicle coordinate system, as a vector in the coordinate system CS1 as the camera coordinate system, the posture of the in-vehicle camera 15*a* in the camera coordinate system may be converted into the posture of the in-vehicle camera 15*a* in the vehicle coordinate system. Therefore, in the embodiment, through a method as described below, the direction of each of the axes Ax1 to Ax3 in the coordinate system CS0 as the vehicle coordinate system is obtained as a vector in the coordinate system CS1 as the camera coordinate system.

As will become clear in the following description, the technique in the embodiment is not a technique of obtaining the origin of the vehicle coordinate system. That is, the technique in the embodiment is a technique of obtaining the actual installation position of the in-vehicle camera 15*a* in the vehicle 1, as a camera parameter, by specifying only the directions of the three axes in the vehicle coordinate system without specifying all of the origin and the directions of the three axes in the vehicle coordinate system.

Referring back to FIG. 4, the straight running determination unit 404 determines whether the vehicle 1 has traveled straight on the basis of whether the transition of the estimated position of the in-vehicle camera 15 exhibits a distribution approximated by a straight line. Then, the straight vector calculation unit 405 calculates a straight vector corresponding to the traveling direction of the vehicle 1 in the camera coordinate system on the basis of the transition of the estimated position of the in-vehicle camera 15 when the vehicle travels straight, that is, the straight line approximating the transition of the estimated position of the in-vehicle camera 15 in a section for which the straight running determination unit 404 has determined that the vehicle 1 has traveled straight. The straight vector is an example of "a first vector" and corresponds to the direction of the axis Ax1 illustrated in FIG. 5.

Figure 6:
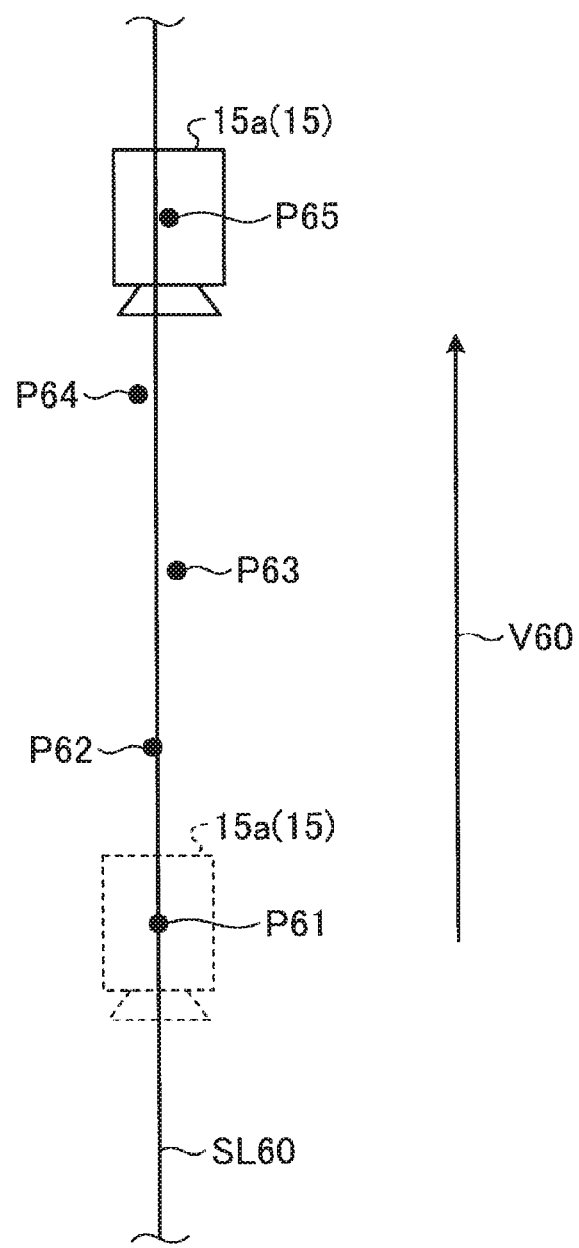
FIG. 6 is an exemplary schematic view illustrating a straight vector calculation method according to the embodiment.

FIG. 6 is an exemplary schematic view illustrating a straight vector calculation method according to the embodiment. The example illustrated in FIG. 6 represents a situation where the estimated position of the in-vehicle camera 15 in the camera coordinate system has shifted to a position P65 from a position P61 through positions P62 to P64.

In the example illustrated in FIG. 6, since the transition from the position P61 to the position P65 applies well to a straight line SL60, it can be said that a distribution approximated by the straight line SL60 is exhibited. Therefore, in the example illustrated in FIG. 6, a vector V60 corresponding to a direction in which the straight line SL60 extends is calculated as a straight vector. It is possible to use conventionally known various search methods in the search of the straight line SL60.

Meanwhile, when the number of points as a target of linear approximation is small, the accuracy of the obtained straight line may not be guaranteed. That is, in order to accurately determine that the vehicle 1 has traveled straight, it is desirable to acquire the transition of the estimated position of the in-vehicle camera 15 in the camera coordinate system, by a predetermined distance or more. Therefore, in the embodiment, the straight running determination unit 404 determines whether the vehicle 1 has traveled straight in a predetermined section on the basis of whether the transition of the estimated position of the in-vehicle camera 15 in the predetermined section having a length equal to or greater than a predetermined length exhibits a distribution approximated by a straight line.

In the embodiment, the sensor information acquired by the sensor information acquisition unit 401 is also useful for determining whether the vehicle 1 has traveled straight. Therefore, in the embodiment, it is also possible for the straight running determination unit 404 to determine whether the vehicle 1 has traveled straight on the basis of at least one of whether the transition of the estimated position of the in-vehicle camera 15 exhibits a distribution approximated by a straight line, and the sensor information. The sensor information used here is, for example, a steering angle of the wheels 3, a yaw angular velocity of the vehicle 1, and the like.

Referring back to FIG. 4, the turning determination unit 406 determines whether the vehicle 1 has turned on the basis of whether the transition of the estimated position of the in-vehicle camera 15 exhibits a distribution approximated by two straight lines extending in directions intersecting each other, and at least one curve extending with a predetermined curvature or more between the corresponding two straight lines. The reason a curvature equal to or greater than a predetermined curvature is required is that only the case where the traveling direction of the vehicle 1 has greatly changed to some extent is regarded as turning of the vehicle 1.

Then, the normal vector calculation unit 407 calculates a normal vector corresponding to the normal direction of a plane corresponding, in the camera coordinate system, to the road surface on which the vehicle 1 travels on the basis of the transition of the estimated position of the in-vehicle camera 15 when the vehicle 1 turns, that is, at least two straight lines approximating the transition of the estimated position of the in-vehicle camera 15 in a section for which the turning determination unit 406 has determined that the vehicle 1 has turned. The normal vector is an example of "a second vector" and corresponds to the direction of the axis Ax2 illustrated in FIG. 5.

Figure 7:
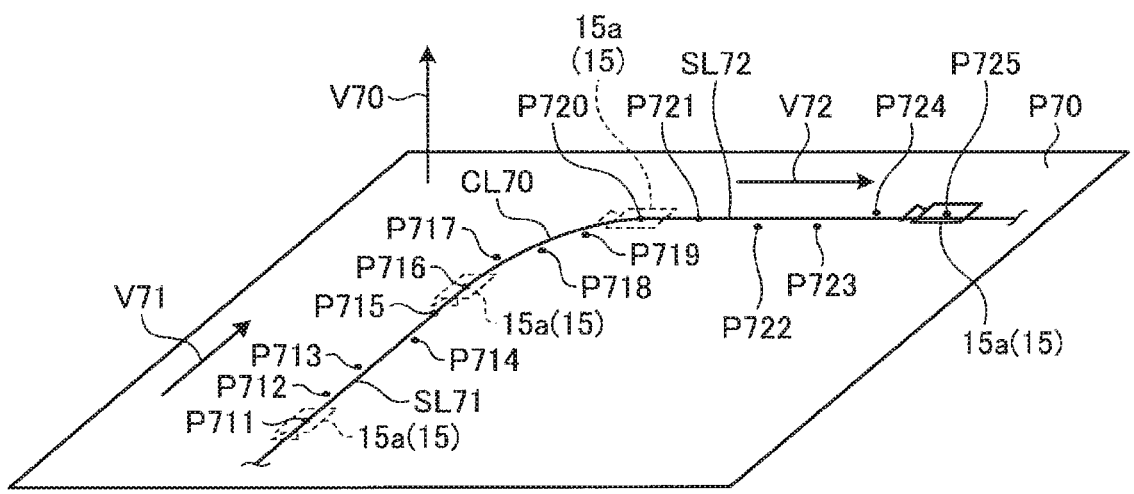
FIG. 7 is an exemplary schematic view illustrating a normal vector calculation method according to the embodiment.

FIG. 7 is an exemplary schematic view illustrating a normal vector calculation method according to the embodiment. The example illustrated in FIG. 7 represents a situation where the estimated position of the in-vehicle camera 15 in the camera coordinate system has shifted to a position P725 from a position P711 through positions P712 to P724 substantially along a plane P70.

In the example illustrated in FIG. 7, the transition from the position P711 to the position P716 applies well to a straight line SL71, the transition from the position P716 to the position P720 applies well to a curve CL70, and the transition from the position P720 to the position P725 applies well to a straight line SL72. Therefore, it can be said that the transition from the position P711 to the position P725 exhibits a distribution approximated by the two straight lines SL71 and SL72 extending in directions intersecting each other, and the curve CL70 extending between the corresponding two straight lines SL71 and SL72.

In the example illustrated in FIG. 7, it is possible to use conventionally known various methods in the search of the straight lines SL71 and SL72, and in the search of the curve CL70. In the example illustrated in FIG. 7, although the straight line SL71, the curve CL70, and the straight line SL72 are continuously connected, a case where these three lines are not connected is also assumed in the embodiment. Further, in the example illustrated in FIG. 7, for the sake of simplicity in the description, although there is no curve other than the curve CL70, a case where one or more curves exist in addition to the curve CL70 is also assumed in the embodiment.

Here, in the example illustrated in FIG. 7, the transition from the position P711 to the position P716 approximated by the straight line SL71, the transition from the position P720 to the position P725 approximated by the straight line SL72, and the transition from P716 to P720 approximated by the curve CL70 exhibit a distribution that is well applied to the same plane P70. That is, in the example illustrated in FIG. 7, the at least two straight lines SL71 and SL72 are arranged on the same plane P70. This means that the road surface on which the vehicle 1 travels while turning is a flat surface that does not include a gradient and is substantially parallel to the plane P70.

Therefore, in the example illustrated in FIG. 7, a vector V70 corresponding to the normal direction of the plane P70 specified based on the at least two straight lines SL71 and SL72 is calculated as a normal vector. Assuming that the two straight lines SL71 and SL72 are arranged on the same plane P70, it is possible to easily calculate the normal vector as the vector V70 orthogonal to a vector V71 corresponding to the direction in which the straight line SL71 extends and a vector V72 corresponding to the direction in which the straight line SL72 extends without specifying the plane P70 itself.

Although illustration is omitted, in the embodiment, even in a case where the transition of the estimated position of the in-vehicle camera 15 exhibits a distribution approximated by two straight lines and at least one curve, when the road surface on which the vehicle 1 travels includes a gradient, a situation occurs in which the two straight lines (and the at least one curve) are not arranged on the same plane. In such a situation, since it is difficult to specify a plane substantially parallel to the road surface on which the vehicle 1 travels, it is difficult to calculate a normal vector. Therefore, in order to easily calculate the normal vector, in addition to the condition that the transition of the estimated position of the in-vehicle camera 15 exhibits a distribution approximated by two straight lines and at least one curve, a condition that the road surface on which the vehicle 1 travels does not include a gradient, that is, a condition that the position transition of the in-vehicle camera 15 exhibits a distribution approximated by one plane, is also required.

Therefore, in the embodiment, the turning determination unit 406 determines whether the vehicle 1 has turned on the basis of whether the transition of the estimated position of the in-vehicle camera 15 exhibits a distribution approximated by one plane corresponding to two straight lines as well as whether the transition of the estimated position of the in-vehicle camera 15 exhibits a distribution approximated by two straight lines and at least one curve. Then, the normal vector calculation unit 407 calculates a vector corresponding to the normal direction of the corresponding one plane, as a normal vector.

In this way, in the embodiment, the normal vector of the road surface in the real world may be calculated as information based on the camera coordinate system. That is, in the camera coordinate system, the axis Ax2 (the up-down direction of the vehicle 1) in the vehicle coordinate system may be specified.

Here, in the example illustrated in FIG. 7, as described above, the transition of the estimated position of the in-vehicle camera 15 exhibits a distribution that applies well to the same plane P70 for all of a portion approximated by the straight line SL71, a portion approximated by the curve CL70, and a portion approximated by the straight line SL72. However, in general, during turning of the vehicle 1, when the traveling direction of the vehicle 1 is changing, the reliability of the estimated position of the in-vehicle camera 15 is likely to be reduced due to the influence of the vertical G, and the like, as compared to that when the traveling direction is not changing before and after the turning.

Therefore, in the example illustrated in FIG. 7, in some cases, information in the portion approximated by the curve CL70 is less reliable than information in the portions approximated by the straight lines SL71 and SL72. Thus, in the embodiment, when one plane as a criterion of determination as to whether the vehicle 1 has turned is specified, it is desirable to exclude the estimated position of the in-vehicle camera 15 acquired when the traveling direction of the vehicle 1 is changing, from consideration.

Therefore, in the embodiment, the turning determination unit 406 determines whether the vehicle 1 has turned, on the basis of whether second portions are approximated by one plane. The second portions correspond to the time when the traveling direction of the vehicle 1 is not changing, among remaining portions in the transition of the estimated position of the in-vehicle camera 15 except for a first portion corresponding to the time when the traveling direction of the vehicle 1 is changing. For example, in the example illustrated in FIG. 7, the first portion is information of the portion approximated by the curve CL70, and the second portions are information of the portions approximated by the straight lines SL71 and SL72.

Further, in the embodiment, similarly to determination as to whether the vehicle 1 has traveled straight, it is possible to use the sensor information acquired by the sensor information acquisition unit 401 in determining whether the vehicle 1 has turned. Therefore, in the embodiment, it is possible for the turning determination unit 406 to determine whether the vehicle 1 has turned on the basis of at least one of whether the transition of the estimated position of the in-vehicle camera 15 exhibits a distribution approximated by two straight lines and at least one curve, and the sensor information.

Referring back to FIG. 4, the orthogonal vector calculation unit 408 calculates an orthogonal vector orthogonal to the straight vector calculated by the straight vector calculation unit 405 and the normal vector calculated by the normal vector calculation unit 407, in the camera coordinate system. The orthogonal vector is an example of "a third vector," and corresponds to the direction of the axis Ax3 illustrated in FIG. 5.

Figure 8:
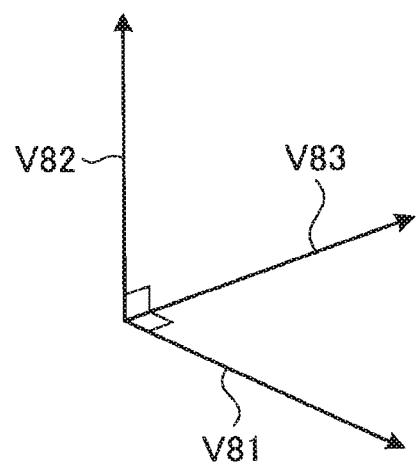
FIG. 8 is an exemplary schematic view illustrating an orthogonal vector calculation method according to the embodiment.

FIG. 8 is an exemplary schematic view illustrating an orthogonal vector calculation method according to the embodiment. Since the orthogonal vector is a vector orthogonal to the straight vector and the normal vector, when it is possible to calculate the straight vector and the normal vector, easy calculation is possible through a vector product, and the like. For example, in the example illustrated in FIG. 8, assuming that a vector V81 is calculated as the straight vector, and a vector V82 is calculated as the normal vector, the orthogonal vector is calculated as a vector V83.

According to the above-described three vectors (the straight vector, the normal vector, and the orthogonal vector), it is possible to convert the estimated posture of the in-vehicle camera 15 in the camera coordinate system, into the actual installation posture of the in-vehicle camera 15 in the vehicle coordinate system based on the direction of the vehicle 1.

That is, referring back to FIG. 4, the camera parameter estimation unit 409 estimates the actual installation posture of the camera in the vehicle 1, as a camera parameter for calibration, on the basis of the straight vector calculated by the straight vector calculation unit 405, the normal vector calculated by the normal vector calculation unit 407, the orthogonal vector calculated by the orthogonal vector calculation unit 408, and the estimated posture of the in-vehicle camera 15 at the point in time when the straight vector is calculated. The estimated posture of the in-vehicle camera 15 taken into consideration here may not be one at the point in time when the straight vector is calculated as long as the estimated position of the in-vehicle camera 15 moves along the direction indicated by the straight vector.

Meanwhile, as described above, the camera parameter to be noted in calibration of the in-vehicle camera 15 includes not only the installation posture of the in-vehicle camera 15 in the vehicle 1, but also the installation position of the in-vehicle camera 15. In particular, the installation height in the installation position of the in-vehicle camera 15 has an influence on the accuracy in the detection of a distance to an object reflected in the captured image, and the like, and thus is an important parameter.

Therefore, in the embodiment, through a method as described below, the camera parameter estimation unit 409 estimates the actual installation height of the in-vehicle camera 15 in the vehicle 1, as the camera parameter.

More specifically, first, the camera parameter estimation unit 409 acquires the three-dimensional position of the road surface on which the vehicle 1 travels, from the three-dimensional information acquired by the three-dimensional information acquisition unit 402.

Here, as described above, the three-dimensional information is calculated by the image processing using the plurality of captured images, and thus the three-dimensional position of the road surface is information based on the camera coordinate system. Therefore, it is possible to obtain the installation height of the in-vehicle camera 15 with respect to the road surface in the camera coordinate system by taking the three-dimensional position of the road surface, and the height component in information representing the estimated position of the in-vehicle camera 15 in the camera coordinate system, the estimated position being acquired by the camera position posture acquisition unit 403, into consideration.

Therefore, as described above, since the camera coordinate system is not absolute information corresponding to the real world, it is required to associate the scale in the camera coordinate system with the scale in the real world by any method.

Therefore, the embodiment focuses on the relationship between the traveling distance of the vehicle 1 specified based on the sensor information acquired by the sensor information acquisition unit 401, and the transition of the estimated position of the in-vehicle camera 15 in the section corresponding to the corresponding traveling distance. That is, the former is information corresponding to the real world, and the latter is information corresponding to the camera coordinate system. However, since both may exhibit the information with the same contents, it is possible to convert the installation height of the in-vehicle camera 15 with respect to the road surface in the camera coordinate system, into the actual installation height of the in-vehicle camera 15 in the vehicle 1 in the real world by focusing on the relationship between the two.

Therefore, in the embodiment, the camera parameter estimation unit 409 estimates the actual installation height of the in-vehicle camera 15 in the vehicle 1, as the camera parameter, on the basis of the traveling distance of the vehicle 1 specified based on the sensor information acquired by the sensor information acquisition unit 401, the transition of the estimated position of the in-vehicle camera 15 in the section corresponding to the corresponding traveling distance, and the estimated three-dimensional position of the road surface included in the three-dimensional information.

In the embodiment, the correction unit 410 executes calibration of the in-vehicle camera 15, including optical axis correction and the like, on the basis of the camera parameter estimated by the camera parameter estimation unit 409.

The calibration by the correction unit 410 may be executed on the basis of the latest camera parameter whenever the camera parameter is newly estimated, or may be executed only when it is determined that calibration is necessary under predetermined criteria. In the latter case, for example, the correction unit 410 may calculate the deviation in camera parameter estimation results accumulated over a plurality of times on the basis of a statistic such as a variance, and change whether or not to execute the calibration on the basis of whether the level of the corresponding deviation is less than a predetermined level, and whether a difference between the camera parameter estimation result and the current camera parameter is equal to or greater than a predetermined value.

Hereinafter, descriptions will be made on a process executed by the camera parameter estimating device 400 according to the embodiment, with reference to FIGS. 9 to 11.

Figure 9:
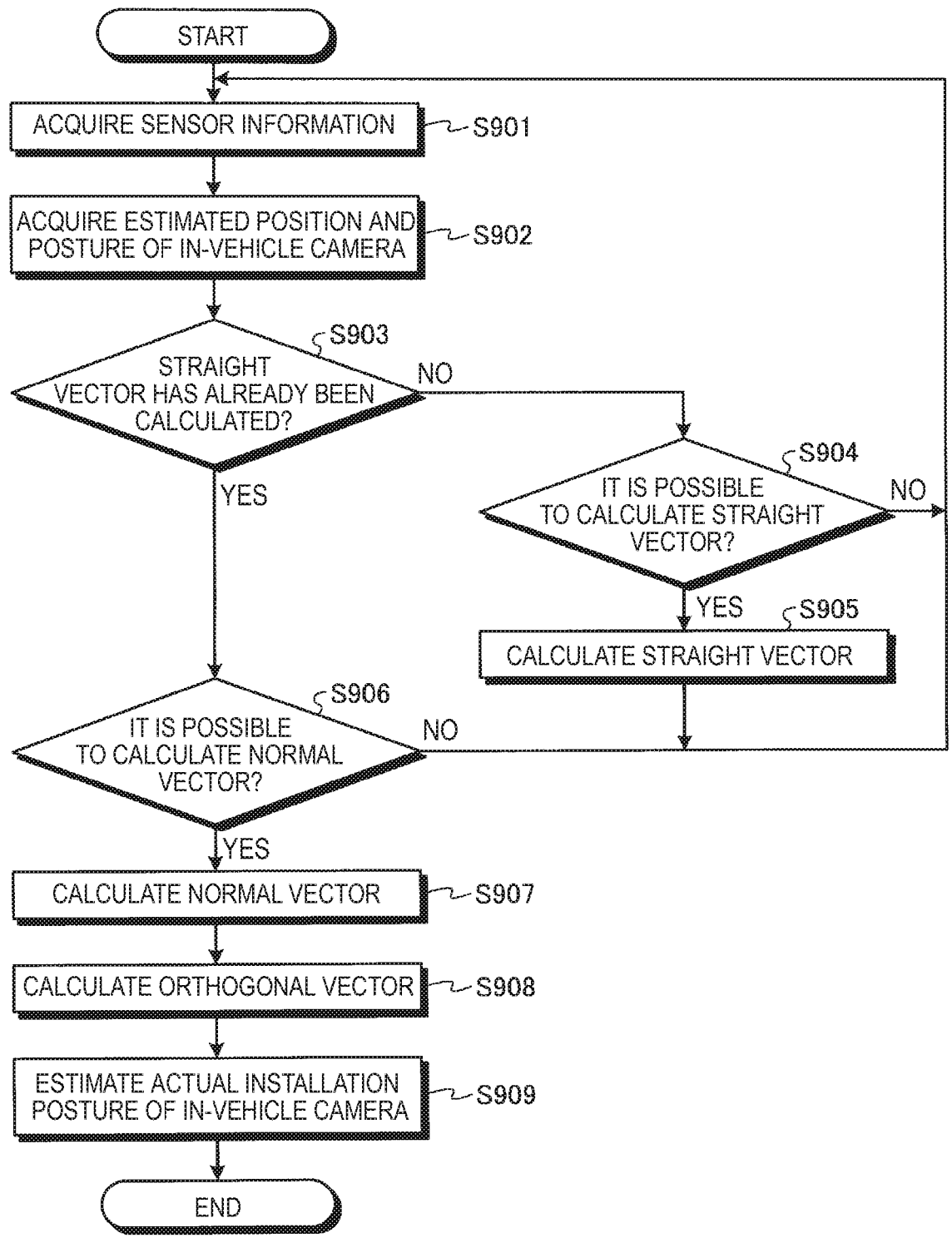
FIG. 9 is an exemplary schematic flow chart illustrating a process executed when the camera parameter estimating device according to the embodiment estimates an actual installation posture of an in-vehicle camera, as a camera parameter.

FIG. 9 is an exemplary schematic flow chart illustrating a process executed when the camera parameter estimating device 400 according to the embodiment estimates an installation posture of the in-vehicle camera 15 as a camera parameter.

As illustrated in FIG. 9, in the embodiment, first, in S901, the sensor information acquisition unit 401 acquires sensor information including the output of the traveling state sensor 306 that detects the traveling state of the vehicle 1.

Then, in S902, the camera position posture acquisition unit 403 acquires the estimated position and posture of the in-vehicle camera 15, in the camera coordinate system set for the in-vehicle camera 15.

Then, in S903, the camera parameter estimating device 400 (for example, the turning determination unit 406) determines whether a straight vector has already been calculated.

In S903, when it is determined that the straight vector has not yet been calculated, the process proceeds to S904. Then, in S904, the straight running determination unit 404 determines whether it is possible to calculate the straight vector, that is, whether the transition of the estimated position of the in-vehicle camera 15 acquired in S902 exhibits a distribution approximated by a straight line.

In S904, when it is determined that it is not possible to calculate the straight vector, the process returns to S901. However, in S904, when it is determined that it is possible to calculate the straight vector, the process proceeds to S905.

In S905, the straight vector calculation unit 405 calculates the straight vector corresponding to the front-rear direction (traveling direction) of the vehicle 1. More specifically, the straight vector calculation unit 405 calculates a vector corresponding to the direction of the straight line that approximates the transition of the estimated position of the in-vehicle camera 15, as the straight vector. Then, the process returns to S901.

Meanwhile, in S903, when it is determined that the straight vector has already been calculated, the process proceeds to S906. That is, in S906, the turning determination unit 406 determines whether it is possible to calculate a normal vector, that is, whether the transition of the estimated position of the in-vehicle camera 15 acquired in S902 exhibits a distribution that is approximated by two straight lines and at least one curve, and approximated by one plane corresponding to the corresponding two straight lines.

In S906, when it is determined that it is not possible to calculate the normal vector, the process returns to S901. However, in S906, when it is determined that it is possible to calculate the normal vector, the process proceeds to S907.

In S907, the normal vector calculation unit 407 calculates the normal vector corresponding to the up-down direction (vertical direction) of the vehicle 1. More specifically, the normal vector calculation unit 407 calculates a vector corresponding to the direction orthogonal to the two straight lines that approximate the transition of the estimated position of the in-vehicle camera 15, that is, a vector corresponding to the normal direction of one plane that approximates the transition of the estimated position of the in-vehicle camera 15, as the normal vector.

Then, in S908, the orthogonal vector calculation unit 408 calculates an orthogonal vector corresponding to the left-right direction (width direction) of the vehicle 1. More specifically, the orthogonal vector calculation unit 408 calculates the orthogonal vector orthogonal to the straight vector and the normal vector on the basis of a vector product and the like of the straight vector calculated in S905, and the normal vector calculated in S907.

Then, in S909, the camera parameter estimation unit 409 estimates an actual installation posture of the in-vehicle camera 15, as the camera parameter. More specifically, the camera parameter estimation unit 409 converts the estimated posture of the in-vehicle camera 15 acquired in S902, as information based on the camera coordinate system, into information based on the vehicle coordinate system corresponding to the real world, on the basis of the straight vector calculated in S905, the normal vector calculated in S907, and the orthogonal vector calculated in S908. Then, the process is ended.

Figure 10:
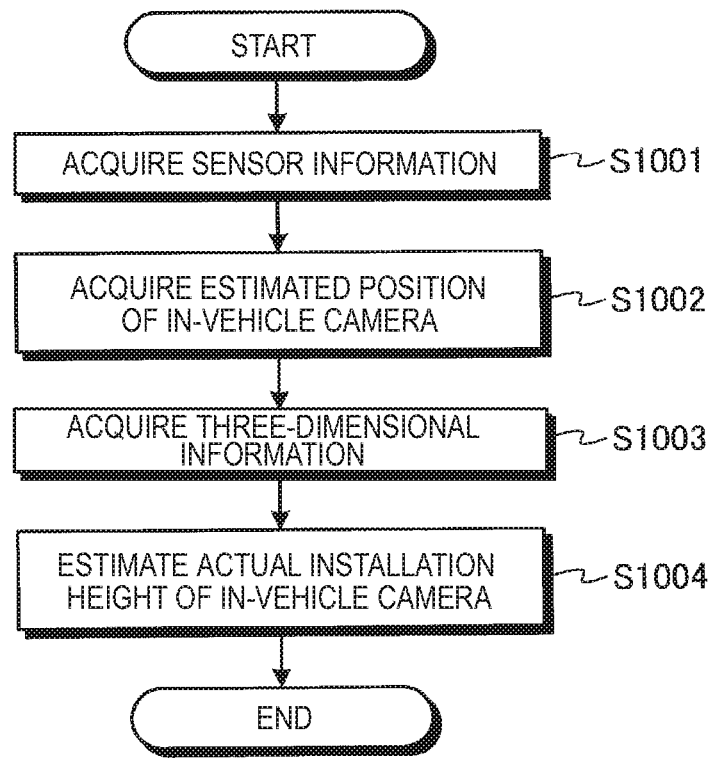
FIG. 10 is an exemplary schematic flow chart illustrating a process executed when the camera parameter estimating device according to the embodiment estimates an actual installation height of the in-vehicle camera, as the camera parameter.

FIG. 10 is an exemplary schematic flow chart illustrating a process executed when the camera parameter estimating device 400 according to the embodiment estimates an installation height of the in-vehicle camera 15 as a camera parameter.

As illustrated in FIG. 10, in the embodiment, first, in S1001, the sensor information acquisition unit 401 acquires sensor information including the output of the traveling state sensor 306 that detects the traveling state of the vehicle 1.

Then, in S1002, the camera position posture acquisition unit 403 acquires the estimated position of the in-vehicle camera 15, in the camera coordinate system set for the in-vehicle camera 15.

Then, in S1003, the three-dimensional information acquisition unit 402 acquires three-dimensional information indicating the situation around the vehicle 1, including a (estimated) three-dimensional position of a road surface on which the vehicle 1 travels. As described above, like the estimated position of the in-vehicle camera 15 acquired in S1002, the three-dimensional information is information based on the camera coordinate system.

Then, in S1004, the camera parameter estimation unit 409 estimates an actual installation height of the in-vehicle camera 15, as the camera parameter. More specifically, the camera parameter estimation unit 409 obtains an installation height of the in-vehicle camera 15 with respect to the road surface on the basis of the height component in the estimated position of the in-vehicle camera 15 acquired in S1002, and the three-dimensional position of the road surface included in the three-dimensional information acquired in S1003, as information based on the camera coordinate system. Then, the camera parameter estimation unit 409 obtains the relationship between the traveling distance of the vehicle 1, in the sensor information acquired in S1001, and the transition of the estimated position of the in-vehicle camera 15 acquired in S1002, and converts the installation height of the in-vehicle camera 15 with respect to the road surface in the camera coordinate system, into the actual installation height of the in-vehicle camera 15 in the vehicle 1 in the real world, on the basis of the corresponding relationship. Then, the process is ended.

Figure 11:
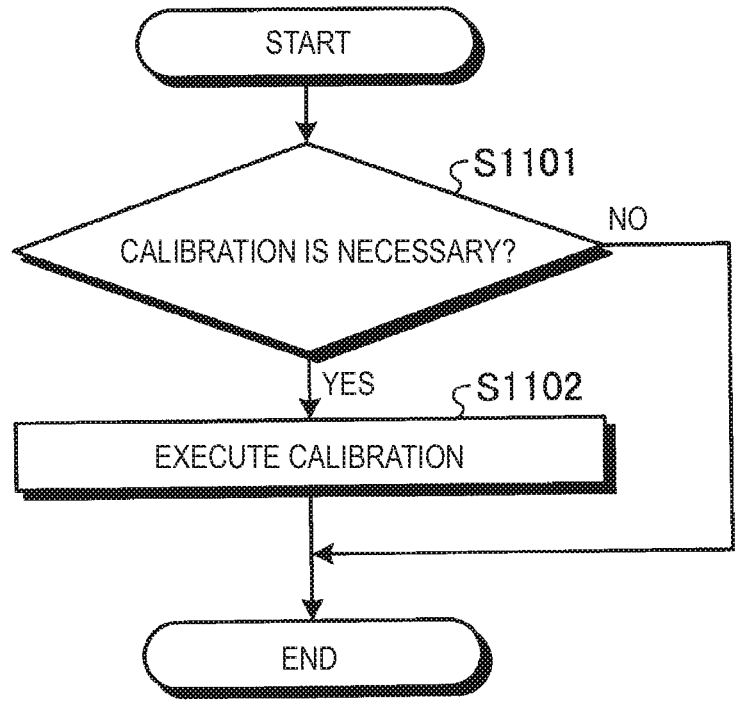
FIG. 11 is an exemplary schematic flow chart illustrating a process executed when the camera parameter estimating device according to the embodiment executes calibration.

FIG. 11 is an exemplary schematic flow chart illustrating a process executed when the camera parameter estimating device 400 according to the embodiment executes calibration. The flow chart illustrated in FIG. 11 corresponds to an example in which the correction unit 410 determines whether calibration is necessary, and executes the calibration as necessary.

As illustrated in FIG. 11, in the embodiment, first, in S1101, the correction unit 410 determines whether calibration is necessary. In this determination, for example, a deviation in camera parameter estimation results accumulated over a plurality of times is calculated on the basis of a statistic such as a variance, and then the calibration is executed on the basis of whether the level of the corresponding deviation is less than a predetermined level, and whether a difference between the most recent camera parameter estimation result and the current camera parameter is equal to or greater than a predetermined value.

In S1101, when it is determined that the calibration is necessary, the process proceeds to S1102. Then, in S1102, the correction unit 410 executes the calibration of the in-vehicle camera 15 on the basis of the most recent camera parameter estimation result. Then, the process is ended.

In S1101, when it is determined that the calibration is not necessary, the calibration is not executed, and the process is ended as it is.

As described above, the camera parameter estimating device 400 according to the embodiment includes the camera position posture acquisition unit 403, the straight vector calculation unit 405, the normal vector calculation unit 407, the orthogonal vector calculation unit 408, and the camera parameter estimation unit 409. The camera position posture acquisition unit 403 acquires the estimated position and posture of the in-vehicle camera 15 in the camera coordinate system set for the in-vehicle camera 15, which are estimated based on a captured image acquired by the surrounding monitoring in-vehicle camera 15 mounted in the vehicle 1. The straight vector calculation unit 405 calculates a straight vector corresponding to the traveling direction of the vehicle 1 in the camera coordinate system on the basis of the transition of the estimated position of the in-vehicle camera 15 when the vehicle 1 travels straight. The normal vector calculation unit 407 calculates a normal vector corresponding to the normal direction of a plane corresponding, in the camera coordinate system, to the road surface on which the vehicle 1 travels on the basis of the transition of the estimated position of the in-vehicle camera 15 when the vehicle 1 turns. The orthogonal vector calculation unit 408 calculates an orthogonal vector orthogonal to the straight vector and the normal vector, in the camera coordinate system. The camera parameter estimation unit 409 estimates the actual installation posture of the in-vehicle camera 15 in the vehicle 1, as a camera parameter for calibration of the in-vehicle camera 15, on the basis of the straight vector, the normal vector, the orthogonal vector, and the estimated posture of the in-vehicle camera 15 when the estimated position of the in-vehicle camera 15 moves along the direction indicated by the straight vector.

According to the camera parameter estimating device 400 according to the embodiment, on the basis of the straight vector, the normal vector, and the orthogonal vector, the estimated posture of the in-vehicle camera 15 in the camera coordinate system is matched with the direction of the vehicle 1 in the real world through conversion, so that the actual installation posture of the in-vehicle camera 15 in the vehicle 1 may be estimated as the camera parameter. Accordingly, it is possible to flexibly estimate the camera parameter without depending on a specific road surface marking.

In the above-described embodiment, the camera parameter estimating device 400 includes the straight running determination unit 404 that determines whether the vehicle 1 has traveled straight on the basis of whether the transition of the estimated position of the in-vehicle camera 15 exhibits a distribution approximated by a straight line. Then, the straight vector calculation unit 405 calculates the straight vector on the basis of the straight line approximating the transition of the estimated position of the in-vehicle camera 15 in a section for which the straight running determination unit 404 has determined that the vehicle 1 has traveled straight. According to this configuration, it is possible to easily execute determination as to whether the vehicle 1 has traveled straight and calculation of the straight vector, on the basis of the result of linear approximation.

In the above-described embodiment, the straight running determination unit 404 determines whether the vehicle 1 has traveled straight in a predetermined section on the basis of whether the transition of the estimated position of the in-vehicle camera 15 in the predetermined section having a length equal to or greater than a predetermined length exhibits a distribution approximated by the straight line. According to this configuration, it is possible to accurately determine whether the vehicle 1 has traveled straight by using information for a distance equal to or longer than the predetermined length.

In the above-described embodiment, the camera parameter estimating device 400 includes the sensor information acquisition unit 401 that acquires sensor information including the output of the traveling state sensor 306 that detects the traveling state of the vehicle 1. Then, the straight running determination unit 404 may determine whether the vehicle 1 has traveled straight on the basis of at least one of whether the transition of the estimated position of the in-vehicle camera 15 exhibits a distribution approximated by the straight line, and the sensor information. According to this configuration, it is possible to easily or accurately determine whether the vehicle 1 has traveled straight on the basis of at least one of the result of linear approximation and the sensor information.

In the above-described embodiment, the camera parameter estimating device 400 includes the turning determination unit 406 that determines whether the vehicle 1 has turned on the basis of whether the transition of the estimated position of the in-vehicle camera 15 exhibits a distribution approximated by two straight lines extending in directions intersecting each other, and at least one curve extending with a predetermined curvature or more between the corresponding two straight lines. Then, the normal vector calculation unit 407 calculates the normal vector on the basis of at least two straight lines approximating the transition of the estimated position of the camera in a section for which the turning determination unit 406 has determined that the vehicle 1 has turned. According to this configuration, it is possible to easily execute determination as to whether the vehicle 1 has turned, and calculation of the normal vector on the basis of the result of linear approximation and curve approximation.

In the above-described embodiment, the turning determination unit 406 further determines whether the vehicle 1 has turned on the basis of whether the transition of the estimated position of the in-vehicle camera 15 exhibits a distribution approximated by one plane corresponding to the at least two straight lines. Then, the normal vector calculation unit 407 calculates a vector corresponding to the normal direction of the one plane, as the normal vector. According to this configuration, it is possible to more easily execute determination as to whether the vehicle 1 has turned, and calculation of the normal vector, on the basis of the result of plane approximation unless the road surface on which the vehicle 1 travels includes a gradient.

In the above-described embodiment, the turning determination unit 406 determines whether the vehicle 1 has turned, on the basis of whether second portions exhibit a distribution approximated by one plane. The second portions correspond to the two straight lines among remaining portions in the transition of the estimated position of the in-vehicle camera 15 except for a first portion corresponding to the at least one curve. According to this configuration, it is possible to improve the accuracy of determination as to whether the vehicle 1 has turned, by excluding the first portion as information whose reliability is likely to be reduced due to the influence of the vertical G and the like when the traveling direction of the vehicle 1 is changing.

In the above-described embodiment, the turning determination unit 406 may determine whether the vehicle 1 has turned on the basis of at least one of whether the transition of the estimated position of the in-vehicle camera 15 exhibits a distribution approximated by the two straight lines and the at least one curve, and the sensor information including the output of the traveling state sensor 306. According to this configuration, it is possible to easily or accurately determine whether the vehicle 1 has turned on the basis of at least one of the result of linear approximation and curve approximation and the sensor information.

In the above-described embodiment, the camera parameter estimating device 400 includes the three-dimensional information acquisition unit 402 that acquires three-dimensional information indicating the situation around the vehicle 1 estimated based on the captured image, including an estimated three-dimensional position of the road surface on which the vehicle 1 travels, in the camera coordinate system. Then, the camera parameter estimation unit 409 estimates an actual installation height of the in-vehicle camera 15 in the vehicle 1, as the camera parameter on the basis of the traveling distance of the vehicle 1 specified based on the sensor information including the output of the traveling state sensor 306, the transition of the estimated position of the in-vehicle camera 15 in the section corresponding to the corresponding traveling distance, and the estimated three-dimensional position of the road surface included in the three-dimensional information. According to this configuration, it is possible to flexibly estimate the actual installation height of the in-vehicle camera 15 as the camera parameter on the basis of the sensor information, the estimated three-dimensional position of the road surface, and the transition of the estimated position of the in-vehicle camera 15, without depending on the specific road surface marking.

In the above-described embodiment, the camera parameter estimating device 400 includes the correction unit 410 that executes calibration of the in-vehicle camera 15 on the basis of the camera parameter estimated by the camera parameter estimation unit 409. According to this configuration, it is possible to easily (automatically) execute the calibration of the in-vehicle camera 15 by the correction unit 410.

The camera parameter estimating program executed in the control device 310 according to the embodiment may be provided or distributed via a network such as the Internet. That is, the camera parameter estimating program executed in the control device 310 according to the embodiment may be provided while stored in a computer connected to a network such as the Internet in such a manner that downloading is acceptable via the network.

<Modification>

In the above-described embodiment, a configuration in which the camera parameter estimating device automatically executes calibration by the correction unit is illustrated. Meanwhile, a configuration in which the correction unit is not included and only estimation of a camera parameter is performed is also useful as in the above-described embodiment. Further, for example, in the following modification illustrated in FIG. 12, a configuration that facilitates the execution of calibration by notifying about the necessity of the calibration without automatically executing the calibration is also useful as in the above-described embodiment.

Figure 12:
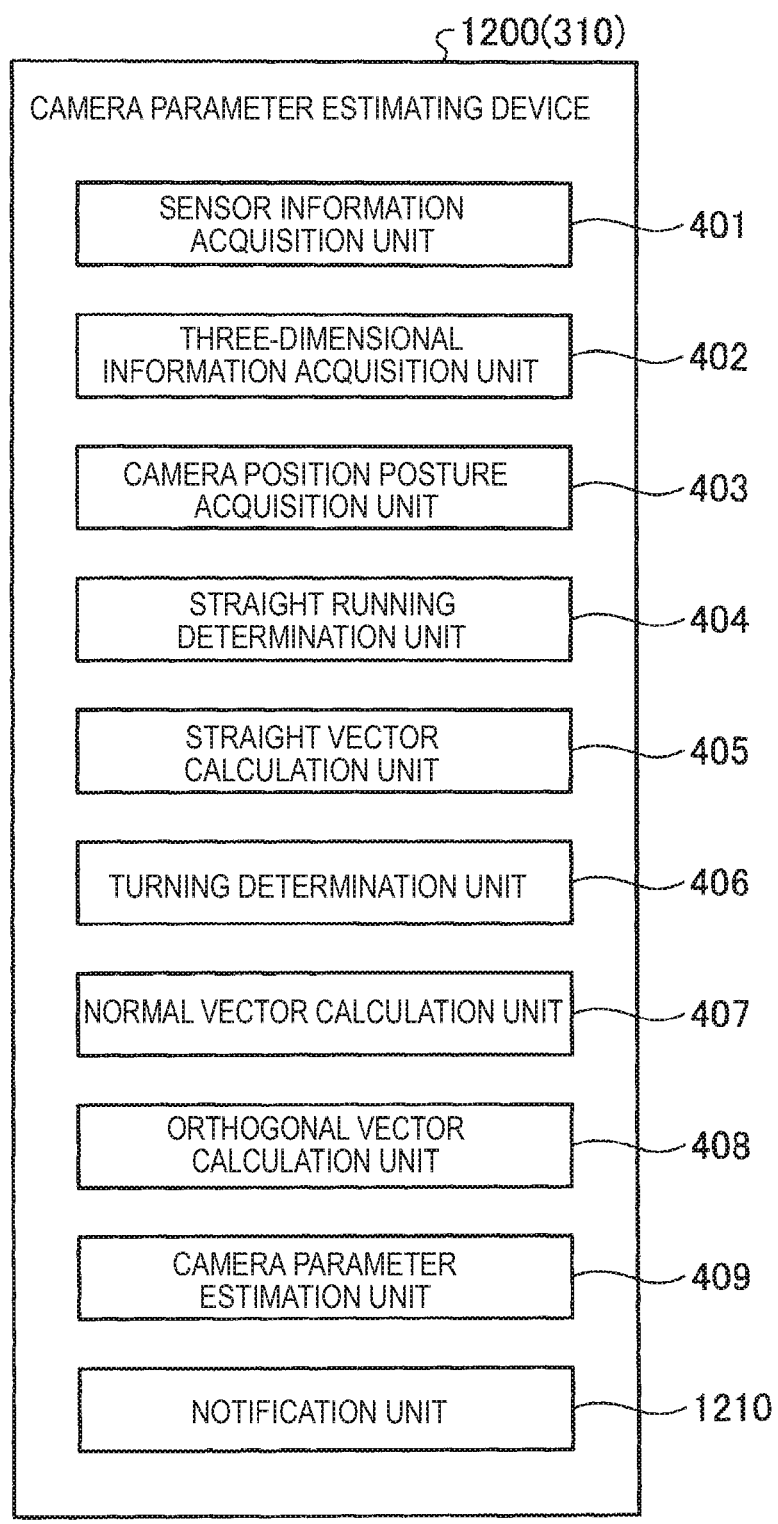
FIG. 12 is an exemplary schematic block diagram illustrating functions of a camera parameter estimating device according to a modification of the embodiment.

FIG. 12 is an exemplary schematic block diagram illustrating functions of a camera parameter estimating device 1200 according to the modification of the embodiment. In FIG. 12, the same functions as those in FIG. 4 are denoted by the same reference numerals.

As illustrated in FIG. 12, the camera parameter estimating device 1200 according to the modification includes a notification unit 1210 instead of the correction unit 410 according to the embodiment as illustrated in FIG. 4. The notification unit 1210 notifies about the necessity of executing calibration on the basis of the camera parameter estimated by the camera parameter estimation unit 409.

For example, the notification unit 1210 calculates the deviation in camera parameter estimation results accumulated over a plurality of times on the basis of a statistic such as a variance, and makes a notification to the effect that the calibration is necessary when the level of the corresponding deviation is less than a predetermined level, and a difference between the camera parameter estimation result and the current camera parameter is equal to or greater than a predetermined value, via the monitor device 11 (see FIG. 3) and the like. Then, in the modification, when a person who has received the notification from the notification unit 1210 requests a manufacturer and the like to inspect the vehicle 1, the calibration is executed by the manufacturer.

As described above, in the modification, the camera parameter estimating device 1200 includes the notification unit 1210 that notifies about the necessity of executing the calibration of the in-vehicle camera 15 on the basis of the camera parameter estimated by the camera parameter estimation unit 409. According to this configuration, it is possible to easily (automatically) notify about the necessity of executing the calibration of the in-vehicle camera 15, by the notification unit 1210.

A camera parameter estimating device according to an aspect of this disclosure includes: a camera position posture acquisition unit configured to acquire an estimated position and an estimated posture of a surrounding monitoring camera mounted in a vehicle in a camera coordinate system set for the camera, which are estimated based on a captured image acquired by the camera; a first vector calculation unit configured to calculate a first vector corresponding to a traveling direction of the vehicle in the camera coordinate system on the basis of transition of the estimated position of the camera when the vehicle travels straight; a second vector calculation unit configured to calculate a second vector corresponding to a normal direction of a plane corresponding, in the camera coordinate system, to a road surface on which the vehicle travels, on the basis of the transition of the estimated position of the camera when the vehicle turns; a third vector calculation unit configured to calculate a third vector orthogonal to the first vector and the second vector, in the camera coordinate system; and a camera parameter estimation unit configured to estimate an actual installation posture of the camera in the vehicle, as a camera parameter for calibration of the camera, on the basis of the first vector, the second vector, the third vector, and the estimated posture of the camera when the estimated position of the camera moves along a direction indicated by the first vector.

According to the above-described camera parameter estimating device, on the basis of the first vector, the second vector, and the third vector, the estimated posture of the camera in the camera coordinate system is matched with the direction of the vehicle in the real world through conversion, so that the actual installation posture of the camera in the vehicle may be estimated as the camera parameter. Accordingly, it is possible to flexibly estimate the camera parameter without depending on a specific road surface marking.

The above-described camera parameter estimating device may further include: a first determination unit configured to determine whether the vehicle has traveled straight on the basis of whether the transition of the estimated position of the camera exhibits a distribution approximated by a straight line, in which the first vector calculation unit may calculate the first vector on the basis of the straight line approximating the transition of the estimated position of the camera in a section for which the first determination unit has determined that the vehicle has traveled straight. According to this configuration, it is possible to easily execute determination as to whether the vehicle has traveled straight and calculation of the first vector, on the basis of the result of linear approximation.

In this case, the first determination unit may determine whether the vehicle has traveled straight in a predetermined section on the basis of whether the transition of the estimated position of the camera in the predetermined section having a length equal to or greater than a predetermined length exhibits a distribution approximated by the straight line. According to this configuration, it is possible to accurately determine whether the vehicle has traveled straight by using information for a distance equal to or longer than the predetermined length.

The above-described camera parameter estimating device including the first determination unit may further include a sensor information acquisition unit configured to acquire sensor information including output of a sensor that detects a traveling state of the vehicle, in which the first determination unit may determine whether the vehicle has traveled straight on the basis of at least one of whether the transition of the estimated position of the camera exhibits a distribution approximated by the straight line, and the sensor information. According to this configuration, it is possible to easily or accurately determine whether the vehicle has traveled straight on the basis of at least one of the result of linear approximation and the sensor information.

The above-described camera parameter estimating device may further include: a second determination unit configured to determine whether the vehicle has turned on the basis of whether the transition of the estimated position of the camera exhibits a distribution approximated by two straight lines extending in directions intersecting each other, and at least one curve extending with a predetermined curvature or more between the corresponding two straight lines, in which the second vector calculation unit may calculate the second vector, on the basis of the at least two straight lines approximating the transition of the estimated position of the camera in a section for which the second determination unit has determined that the vehicle has turned. According to this configuration, it is possible to easily execute determination as to whether the vehicle has turned, and calculation of the second vector on the basis of the result of linear approximation and curve approximation.

In this case, the second determination unit may further determine whether the vehicle has turned on the basis of whether the transition of the estimated position of the camera exhibits a distribution approximated by one plane corresponding to the at least two straight lines, and the second vector calculation unit may calculate a vector corresponding to a normal direction of the one plane, as the second vector. According to this configuration, it is possible to more easily execute determination as to whether the vehicle has turned, and calculation of the second vector, on the basis of the result of plane approximation unless the road surface on which the vehicle travels includes a gradient.

In this case, the second determination unit may determine whether the vehicle has turned, on the basis of whether second portions exhibit a distribution approximated by the one plane, the second portions corresponding to the two straight lines among remaining portions in the transition of the estimated position of the camera except for a first portion corresponding to the at least one curve. According to this configuration, it is possible to improve the accuracy of determination as to whether the vehicle has turned, by excluding the first portion as information whose reliability is likely to be reduced due to the influence of the vertical G, and the like when the traveling direction of the vehicle is changing.

The above-described camera parameter estimating device including the second determination unit may further include a sensor information acquisition unit configured to acquire sensor information including output of a sensor that detects a traveling state of the vehicle, in which the second determination unit may determine whether the vehicle has turned on the basis of at least one of whether the transition of the estimated position of the camera exhibits a distribution approximated by the two straight lines and the at least one curve, and the sensor information. According to this configuration, it is possible to easily or accurately determine whether the vehicle has turned on the basis of at least one of the result of linear approximation and curve approximation and the sensor information.

The above-described camera parameter estimating device may further include: a sensor information acquisition unit configured to acquire sensor information including output of a sensor that detects a traveling state of the vehicle; and a three-dimensional information acquisition unit configured to acquire three-dimensional information indicating a situation around the vehicle estimated based on the captured image, including an estimated three-dimensional position of the road surface on which the vehicle travels, in the camera coordinate system, in which the camera parameter estimation unit may estimate an actual installation height of the camera in the vehicle, as the camera parameter, on the basis of a traveling distance of the vehicle specified based on the sensor information, the transition of the estimated position of the camera in a section corresponding to the corresponding traveling distance, and the estimated three-dimensional position of the road surface included in the three-dimensional information. According to this configuration, it is possible to flexibly estimate the actual installation height of the camera as the camera parameter on the basis of the sensor information, the estimated three-dimensional position of the road surface, and the transition of the estimated position of the camera, without depending on the specific road surface marking.

The above-described camera parameter estimating device may further include a correction unit configured to execute the calibration of the camera on the basis of the camera parameter estimated by the camera parameter estimation unit. According to this configuration, it is possible to easily (automatically) execute the calibration of the camera by the correction unit.

The above-described camera parameter estimating device may further include a notification unit configured to notify about necessity of executing the calibration of the camera on the basis of the camera parameter estimated by the camera parameter estimation unit. According to this configuration, it is possible to easily (automatically) notify about the necessity of executing the calibration of the camera, by the notification unit.

A camera parameter estimating method according to another aspect of this disclosure includes: acquiring an estimated position and an estimated posture of a surrounding monitoring camera mounted in a vehicle in a camera coordinate system set for the camera, which are estimated based on a captured image acquired by the camera; calculating a first vector corresponding to a traveling direction of the vehicle in the camera coordinate system on the basis of transition of the estimated position of the camera when the vehicle travels straight; calculating a second vector corresponding to a normal direction of a plane corresponding, in the camera coordinate system, to a road surface on which the vehicle travels, on the basis of the transition of the estimated position of the camera when the vehicle turns; calculating a third vector orthogonal to the first vector and the second vector in the camera coordinate system; and estimating an actual installation posture of the camera in the vehicle, as a camera parameter for calibration of the camera, on the basis of the first vector, the second vector, the third vector, and the estimated posture of the camera when the estimated position of the camera moves along a direction indicated by the first vector.

According to the above-described camera parameter estimating method, on the basis of the first vector, the second vector, and the third vector, the estimated posture of the camera in the camera coordinate system is matched with the direction of the vehicle in the real world through conversion, so that the actual installation posture of the camera in the vehicle may be estimated as the camera parameter. Accordingly, it is possible to flexibly estimate the camera parameter without depending on a specific road surface marking.

A camera parameter estimating program according to another aspect of this disclosure causes a computer to execute a process including: acquiring an estimated position and an estimated posture of a surrounding monitoring camera mounted in a vehicle in a camera coordinate system set for the camera, which are estimated based on a captured image acquired by the camera; calculating a first vector corresponding to a traveling direction of the vehicle in the camera coordinate system on the basis of transition of the estimated position of the camera when the vehicle travels straight; calculating a second vector corresponding to a normal direction of a plane corresponding, in the camera coordinate system, to a road surface on which the vehicle travels, on the basis of the transition of the estimated position of the camera when the vehicle turns; calculating a third vector orthogonal to the first vector and the second vector in the camera coordinate system; and estimating an actual installation posture of the camera in the vehicle, as a camera parameter for calibration of the camera, on the basis of the first vector, the second vector, the third vector, and the estimated posture of the camera when the estimated position of the camera moves along a direction indicated by the first vector.

According to the above-described camera parameter estimating program, on the basis of the first vector, the second vector, and the third vector, the estimated posture of the camera in the camera coordinate system is matched with the direction of the vehicle in the real world through conversion, so that the actual installation posture of the camera in the vehicle may be estimated as the camera parameter. Accordingly, it is possible to flexibly estimate the camera parameter without depending on a specific road surface marking.

The embodiment disclosed here and the modification have been described as above, but the above-described embodiment and modification are merely exemplary, and are not intended to limit the scope of the disclosure. The above-described novel embodiment and modification may be implemented in various forms, and various omissions, replacements, and changes may be executed in a range not departing from the gist of the disclosure. The above-described embodiment and modification are not only included in the scope or the gist of the disclosure, but also included in the disclosure described in the claims and equivalents thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A camera parameter estimating device comprising:
at least one processor configured to implement:
a camera position posture acquisition unit configured to acquire an estimated position and an estimated posture of a surrounding monitoring camera mounted in a vehicle in a camera coordinate system set for the camera, which are estimated based on a captured image acquired by the camera;
a first vector calculation unit configured to calculate a first vector corresponding to a traveling direction of the vehicle in the camera coordinate system on the basis of transition of the estimated position of the camera when the vehicle travels straight;
a second vector calculation unit configured to calculate a second vector corresponding to a normal direction of a plane corresponding, in the camera coordinate system, to a road surface on which the vehicle travels, on the basis of the transition of the estimated position of the camera when the vehicle turns;
a third vector calculation unit configured to calculate a third vector orthogonal to the first vector and the second vector, in the camera coordinate system; and
a camera parameter estimation unit configured to estimate an actual installation posture of the camera in the vehicle, as a camera parameter for calibration of the camera, on the basis of the first vector, the second vector, the third vector, and the estimated posture of the camera when the estimated position of the camera moves along a direction indicated by the first vector.

2. The camera parameter estimating device according to claim 1, further comprising:
a first determination unit configured to determine whether the vehicle has traveled straight on the basis of whether the transition of the estimated position of the camera exhibits a distribution approximated by a straight line, wherein
the first vector calculation unit calculates the first vector on the basis of the straight line approximating the transition of the estimated position of the camera in a section for which the first determination unit has determined that the vehicle has traveled straight.

3. The camera parameter estimating device according to claim 2, wherein
the first determination unit determines whether the vehicle has traveled straight in a predetermined section on the basis of whether the transition of the estimated position of the camera in the predetermined section having a length equal to or greater than a predetermined length exhibits a distribution approximated by the straight line.

4. The camera parameter estimating device according to claim 2, further comprising:
a sensor information acquisition unit configured to acquire sensor information including output of a sensor that detects a traveling state of the vehicle, wherein
the first determination unit determines whether the vehicle has traveled straight on the basis of at least one of whether the transition of the estimated position of the camera exhibits a distribution approximated by the straight line, and the sensor information.

5. The camera parameter estimating device according to claim 1, further comprising:
a second determination unit configured to determine whether the vehicle has turned on the basis of whether the transition of the estimated position of the camera exhibits a distribution approximated by two straight lines extending in directions intersecting each other, and at least one curve extending with a predetermined curvature or more between the corresponding two straight lines, wherein
the second vector calculation unit calculates the second vector on the basis of the at least two straight lines approximating the transition of the estimated position of the camera in a section for which the second determination unit has determined that the vehicle has turned.

6. The camera parameter estimating device according to claim 5, wherein
the second determination unit further determines whether the vehicle has turned on the basis of whether the transition of the estimated position of the camera exhibits a distribution approximated by one plane corresponding to the at least two straight lines, and
the second vector calculation unit calculates a vector corresponding to a normal direction of the one plane, as the second vector.

7. The camera parameter estimating device according to claim 6, wherein
the second determination unit determines whether the vehicle has turned, on the basis of whether second portions exhibit a distribution approximated by the one plane, the second portions corresponding to the two straight lines among remaining portions in the transition of the estimated position of the camera except for a first portion corresponding to the at least one curve.

8. The camera parameter estimating device according to claim 5, further comprising:
a sensor information acquisition unit configured to acquire sensor information including output of a sensor that detects a traveling state of the vehicle, wherein
the second determination unit determines whether the vehicle has turned on the basis of at least one of whether the transition of the estimated position of the camera exhibits a distribution approximated by the two straight lines and the at least one curve, and the sensor information.

9. The camera parameter estimating device according to claim 1, further comprising:
a sensor information acquisition unit configured to acquire sensor information including output of a sensor that detects a traveling state of the vehicle; and
a three-dimensional information acquisition unit configured to acquire three-dimensional information indicating a situation around the vehicle estimated based on the captured image, including an estimated three-dimensional position of the road surface on which the vehicle travels, in the camera coordinate system, wherein
the camera parameter estimation unit estimates an actual installation height of the camera in the vehicle, as the camera parameter, on the basis of a traveling distance of the vehicle specified based on the sensor information, the transition of the estimated position of the camera in a section corresponding to the corresponding traveling distance, and the estimated three-dimensional position of the road surface included in the three-dimensional information.

10. The camera parameter estimating device according to claim 1, further comprising:

a correction unit configured to execute the calibration on the basis of the camera parameter estimated by the camera parameter estimation unit.

11. The camera parameter estimating device according to claim 1, further comprising:
a notification unit configured to notify about necessity of executing the calibration on the basis of the camera parameter estimated by the camera parameter estimation unit.

12. A camera parameter estimating method comprising:
acquiring an estimated position and an estimated posture of a surrounding monitoring camera mounted in a vehicle in a camera coordinate system set for the camera, which are estimated based on a captured image acquired by the camera;
calculating a first vector corresponding to a traveling direction of the vehicle in the camera coordinate system on the basis of transition of the estimated position of the camera when the vehicle travels straight;
calculating a second vector corresponding to a normal direction of a plane corresponding, in the camera coordinate system, to a road surface on which the vehicle travels, on the basis of the transition of the estimated position of the camera when the vehicle turns;
calculating a third vector orthogonal to the first vector and the second vector in the camera coordinate system; and
estimating an actual installation posture of the camera in the vehicle, as a camera parameter for calibration of the camera, on the basis of the first vector, the second vector, the third vector, and the estimated posture of the camera when the estimated position of the camera moves along a direction indicated by the first vector.

13. A camera parameter estimating program stored on a non-transitory computer readable medium comprising instructions for causing a computer to execute a process comprising:
acquiring an estimated position and an estimated posture of a surrounding monitoring camera mounted in a vehicle in a camera coordinate system set for the camera, which are estimated based on a captured image acquired by the camera;
calculating a first vector corresponding to a traveling direction of the vehicle in the camera coordinate system on the basis of transition of the estimated position of the camera when the vehicle travels straight;
calculating a second vector corresponding to a normal direction of a plane corresponding, in the camera coordinate system, to a road surface on which the vehicle travels, on the basis of the transition of the estimated position of the camera when the vehicle turns;
calculating a third vector orthogonal to the first vector and the second vector in the camera coordinate system; and
estimating an actual installation posture of the camera in the vehicle, as a camera parameter for calibration of the camera, on the basis of the first vector, the second vector, the third vector, and the estimated posture of the camera when the estimated position of the camera moves along a direction indicated by the first vector.

* * * * *